(12) United States Patent
Kothare et al.

(10) Patent No.: US 7,194,317 B2
(45) Date of Patent: Mar. 20, 2007

(54) FAST PLANT TEST FOR MODEL-BASED CONTROL

(75) Inventors: Simone L. Kothare, Bethlehem, PA (US); Jorge Anibal Mandler, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1007 days.

(21) Appl. No.: 10/225,675

(22) Filed: Aug. 22, 2002

(65) Prior Publication Data

US 2004/0064202 A1    Apr. 1, 2004

(51) Int. Cl.
G05B 13/02 (2006.01)
G01D 3/00 (2006.01)
G01M 19/00 (2006.01)
G01P 21/00 (2006.01)

(52) U.S. Cl. .................... 700/29; 700/28; 700/38; 700/39; 702/108; 702/110

(58) Field of Classification Search ............ 700/28–29, 700/38–39; 702/108, 110
See application file for complete search history.

(56) References Cited

U.S. PATENT DOCUMENTS

| 4,686,655 A | * | 8/1987 | Hyatt ............................ 367/59 |
| 5,162,723 A | * | 11/1992 | Marzalek et al. ........ 324/76.19 |
| 5,315,538 A | * | 5/1994 | Borrell et al. ............... 702/189 |
| 5,471,880 A | * | 12/1995 | Lang et al. .................... 73/660 |
| 5,511,431 A | * | 4/1996 | Hinton ........................ 73/806 |
| 2001/0014834 A1 | * | 8/2001 | Shah ........................... 700/29 |

FOREIGN PATENT DOCUMENTS

| DE | 131 118 | 7/1978 |
| DE | 240 791 1 | 12/1986 |

OTHER PUBLICATIONS

European Search Report dated Jan. 3, 2004.
M. R. Buckner and T. W. Kerlin. Optimum binary signals for reactor frequency response imeasurements. *Nucl. Sci. Eng.*, 49:255-262, 1972.
J. E. J. Dennis and R. B. Schnabel. *Numerical Methods for Unconstrained Optimization and Non-linear Equations*. Prentice Hall, Englewood Cliffs, New Jersey, 1983.

(Continued)

*Primary Examiner*—Anthony Knight
*Assistant Examiner*—Ronald D. Hartman, Jr.
(74) *Attorney, Agent, or Firm*—Willard Jones, II

(57) ABSTRACT

A method and apparatus for designing perturbation signals to excite a number of input variables of a system, in order to test that system for the purpose of obtaining models for the synthesis of a model-based controller. The method begins with providing input parameters of the system. A plurality of binary multi-frequency (BMF) signals are generated based on these input parameters and the frequency spectra of these BMF signals are calculated. One BMF signal is selected out of the set of BMF signals so that the frequency spectrum of the selected BMF signal most closely matches a desired frequency spectrum specified by the input parameters. The selected BMF signal is used as a first perturbation signal for testing the system. The selected BMF signal is also shifted by predetermined amounts of samples to create delayed copies of the original BMF signal to be used as additional perturbation signals.

29 Claims, 11 Drawing Sheets

OTHER PUBLICATIONS

W. A. Docter. *Order Reduction of Nonlinear Dynamic Models by Subspace Identification and Strategies Regression*. PhD thesis, Lehigh University, Bethlehem, PA, 1999.

K. Godfrey, editor. *Perturbation Signals for System Identification*. Prentice Hall International (UK) Limited, 1994.

S. L. Harris and D. A. Mellichamp. On-line identification of process dynamics: use of multifrequency binary signals. *Industrial and Engineering Chemistry Process Design and Development*, 19:166-176, 1980.

I. A. Henderson and J. McGhee. Compact symmetrical binary codes for system identification. *Mathl. Comput. Modelling*, 14:213-218, 1990.

C. Koung and J. F. MacGregor. Identification for robust multivariable control: the design of experiments. *Automatica*, 30:1541-1554, 1994.

L. Ljung. *System Identification: Theory for the User*. Prentice-Hall Information and System Sciences Series. Prentice-Hall, Inc., Englewood Cliffs, NJ, 1987.

K. D. Paehlike and H. Rake. Binary multifrequency signals—synthesis and application. In *5 IFAC Symposium on Identification and System Parameter Estimation*, pp. 589-596, Darmstadt, Sep. 1979.

T. Söderström and P. Stoica. *System Identification*. Prentice Hall International Series in Systems and Control Engineering. Prentice Hall, New York, 1989.

A. Van den Bos. Construction of binary multifrequency test signals. In *1 st IFAC Symposium on Identification in Automatic Control Systems*, Prague, Jun. 1967.

A. Van den Bos. Estimation of linear system coefficients from noisy responses to binary multifrequency test signals. In *2 nd IFAC Symposium on Identification and Process Parameter Estimation*, Prague, Jun. 1970.

A. Van den Bos and R. G. Krol. Synthesis of discrete-interval binary signals with specific Fourier amplitude spectra. *International Journal of Control*, 30:871-884, 1979.

E. van der Ourderaa, J. Schoukens, and J. Renneboog. Peak factor minimization using a time-frequency domain swapping algorithm. *IEEE Trans. on Instrum. Meas.*, IM-37:145-147, 1988.

Q. Zhan and C. Georgakis. Multivariable Input Signal Design for Process Identification. In *The 30 th Industrial Advisory Committee Meeting*, Lehigh University, PA, 10 1999.

Y. Zhu. Multivariable process identification for mpc: the asymptotic method and its applications. *J. Proc. Com.*, 6(2);101-113, 1998.

N. Zierler. Linear recurring sequences. *Journal Soc. Ind. Appl. Math.*, 7:31-48, 1959.

L. W. Bezanson and S. L. Harris. Identification and Control of an Extender using Multivariable Algorithms. *IEEE Proceedings*, 133(4):145-152, Jul. 1986.

S. Boyden, *DMCplus™ 1.1-Multivariable Control Software—Training Course Slides—Reference Notes*. Aspen Technology, Inc., Houston, TX, Jun. 1999.

B. J. Cott. Introduction to the Process Identification Workshop at the 1992 Canadian Chemical Engineering Conference. *Journal of Process Control*, 5(2):67-69, 1995.

B. J. Cott. Summary of the Process Identification Workshop at the 1992 Canadian Chemical Engineering Conference. *Journal of Process Control*, 5(2):109-113, 1995.

S. V. Gaikwad and D. E. Rivera. Integrated Identification and Control for Model Predictive Controllers. In *AiChE Meeting*, San Francisco, CA, Nov. 1994. Session: Model Prredictive Control, paper 227a.

I. Kollár. *Frequency Domain System Identification Toolbox User Guide*. The MathWorks, Inc., MA, 1995.

T. Li and C. Georgakis. Design of Multivariable Identification Signals for Constrained Systems. In *Chemical Process Modeling and Control Research Center—32 nd Industrial Advisory Committee Meeting*, Lehigh University, Bethelhem, PA, Oct. 2000.

L. Ljung. Identification for Control—What is there to learn? Technical Report LiTH-ISY-R-1996, Linköping University, Department of Electrical Engineering, Linköping, Sweden, Jan. 1998.

D. E. Rivera. Principles of System Identification. Arizona State University, College of Engineering and Applied Sciences, Tempe, AZ, Jan. 1999. Short course notes.

D. E. Rivera, J. F. Pollard, and C. E. Garcia. Control-Relevant Parameter Estimation via Prediction-Error Methods: Implications for Digital PID and QDMC Control. In *AIChE Meeting*, Chicago, IL, Nov. 1990. Session: Model Predictive control, paper 4a.

Q. Zhan. Multivariable Test Signal Design and Constrained Identification for the Process Industry. Technical report, Lehigh University, Department of Chemical Engineering, Bethelehem, PA, Mar. 1999. Candidacy Report.

European Search Report dated Jan. 3, 2004.

\* cited by examiner

</p>

FAST PLANT TEST FOR MODEL-BASED CONTROL

BACKGROUND OF THE INVENTION

The present invention relates to a method and apparatus for open-loop testing and system identification to generate models of a system for model-based control of the system. More specifically, the present invention relates to a method of system identification of a multivariable nature using plant-friendly binary multi-frequency signals, in conjunction with multivariable parametric modeling techniques, to achieve significant time savings in testing time.

One method of characterizing the dynamics of a system is to apply perturbation signals at the input channels and measure the response of the system to these signals. The input and output signals are then processed to give an estimate of the dynamics of the system. This procedure is known as system identification.

In much of the literature and prior art on system identification, little attention has been paid to the design of the perturbation signal itself, other than to the fact that the signals should be persistently exciting. In the case of linear systems, this means that the signal should adequately span the bandwidth of the system being identified. One of the main reasons for this lack of attention has been an emphasis in the literature on system identification techniques for parametric models (e.g., a sum of exponentials fit to a step response, a continuous or discrete transfer function, a state-space representation, etc.). The main focus has been discrete transfer function models of single-input single-output (SISO), linear, time-invariant systems. Under these circumstances, there is not usually a great deal to choose among different perturbation signal designs. However, this is quite an idealized situation in many applications and, in practice, many signal design issues do arise.

For example, the theoretical requirement of persistent excitation on the input signals often clashes with practical considerations of "plant-friendliness." In order to be plant-friendly, it is desirable for an input signal to: be as short as possible; not take actuators to limits or exceed move size restrictions; and cause minimum disruption to the controlled variables (i.e., low variance and small deviations from setpoint). It is, therefore, desirable to design a signal that strikes a reasonable compromise between being persistently exciting and plant-friendly.

An important question in most industrial applications is whether there may be signals and techniques, which minimize the time spent in data collection for system identification. When identifying a multi-input multi-output (MIMO) system, it is also desirable to obtain several statistically uncorrelated signals, thereby making it easier to separate out the various input/output relationships of the system. Also, when the purpose of the system identification exercise is to obtain a model for a model-based controller, it is desirable to identify the frequency region most relevant for closed-loop operation and design perturbation signals to excite the system primarily in this region.

Regarding time-domain identification, the use of step signals is a common practice. In addition, relevant work appeared in the 1960s and 1970s and stemmed from pseudo-random signals (i.e., deterministic signals with properties similar to those of random signals) based on shift register sequences.

The ease of generation of signals based on maximum-length binary sequences using shift register circuits has resulted in them being used in a range of applications. Other types of periodic signals have found little application so far given that they cannot be easily generated using shift register circuitry. These are referred to as multi-level pseudo-random signals (also know as m-signals). Also in the time domain, the use of non-periodic signals and non-periodic correlation has been investigated in the area of communications over the last few years.

Regarding frequency-domain identification, *Perturbation Signals for System Identification* edited by Keith Godfrey (1994) is a reference, which brings a significant amount of material on the subject together. However, there are no examples in which models obtained with different input signals are compared and the strengths and weaknesses of the different perturbation signal designs are emphasized. Nonetheless, the book is still useful for making the reader aware of the variety of perturbation signal design options available in the literature.

On the issue of system identification for model-based control and, more specifically, model predictive control (MPC), recent interest has emerged in the automatic control community. Step testing is often adopted in open-loop data collection for MPC modeling.

Step testing assumes that only one input channel is moved at a time. Each step move is held for a relatively long length of time. Often, each input move is held for an average of half the process settling time and a series of 15–20 moves may be executed for each input. In terms of their frequency characteristics, step signals tend to emphasize steady-state behavior and do not focus, therefore, on the closed-loop (faster) behavior. This means that a model with poor dynamic properties may be obtained. The plant testing time estimate for MPC, $T_{test}$, may become prohibitively long for systems with long process settling time and/or large number of independent variables. For example, in a typical air separation process, $T_{test}$ may easily vary between 1 to 2 months depending on the particular process characteristics. This excessive plant testing time often translates into practical and economical infeasibility of MPC projects.

The main reason for this long testing time is the fact that step testing emphasizes the low frequency, steady-state, behavior of the process. This translates into long duration step moves. However, for the purpose of process control, the process information in the closed-loop bandwidth is the information most relevant for satisfactory controller operation. The difference between the closed-loop and open-loop bandwidths increases the faster the controller renders the closed-loop in comparison to the open-loop response.

Thus, plant testing time savings and better models for control may be obtained by focusing on models for satisfactory controller performance, as opposed to models obtained for the purpose of gaining thorough physical insight into the given process. This realization has been exploited in the present invention in the reduction of testing time.

The large number of step moves often used in step testing may also cause lengthening of a plant test. A large number of step moves is generally desired in order to minimize the effects of noise on the data, especially when a large signal-to-noise ratio (S/N) is not possible during test. Furthermore, unmeasured disturbances, environmental changes, or changes in operation mode during a test may cause one or more output responses to drift. Such drifting of output responses may require corrective action which, in turn, may lead to unwanted correlation between the input channels. This means that, later into the data collection, a set of data without correlation between the input channels involved is necessary. In other words, more data needs to be collected.

The technical issue of reducing plant testing time, while extracting the information relevant for process control in a plant-friendly manner and without compromising (and possibly improving) the quality of the obtained models, is challenging. This is the focus of the present invention.

BRIEF SUMMARY OF THE INVENTION

One embodiment of the present invention is a method and apparatus for designing perturbation signals to excite a predetermined number of input variables of a system, in order to test that system for the purpose of obtaining models for the synthesis of a model-based controller. This exemplary method begins with the step of providing input parameters of the system. A plurality of binary multi-frequency (BMF) signals are then generated based on these input parameters and the frequency spectra of these BMF signals are calculated. One of the BMF signals is selected out of the set of BMF signals so that the frequency spectrum of the selected BMF signal most closely matches a desired frequency spectrum specified by the input parameters. The selected BMF signal is then used as a first perturbation signal for testing the system. The selected BMF signal is also shifted by a delay time amount of samples to create a delayed copy of the original BMF signal to be used as a second perturbation signal for system testing.

Another embodiment of the present invention is a method and apparatus for designing perturbation signals to excite a predetermined number of input variables of a system, in order to test that system for the purpose of obtaining models for the synthesis of a model-based controller. This exemplary method begins with the step of providing input parameters of the system, including selecting a perturbation signal frequency spectrum. A plurality of BMF signals are then generated based on these input parameters and the frequency spectra of these BMF signals are calculated. Based on the match between the signal frequency spectra of the BMF signals and the desired perturbation signal frequency spectrum, a set of the BMF signals is selected, each selected BMF signal having substantially 100% of useful power. One of the BMF signals from this set of BMF signals is selected out for which the frequency spectrum most closely matches the selected perturbation signal frequency spectrum. The selected BMF signal is then used as a first perturbation signal for testing the system. The selected BMF signal is also shifted by a delay time amount of samples so that the original BMF signal and its delayed copy are nearly stochastically uncorrelated during one system settling time. The delayed BMF signal is then used as a second perturbation signal for system testing.

A further embodiment of the present invention is a method and apparatus for designing plant-friendly perturbation signals to excite a predetermined number of input channels of a system, in order to test that system for the purpose of obtaining models for the synthesis of a model-based controller. This exemplary method begins with the step of determining the system settling time. A plurality of nearly stochastically uncorrelated BMF signals to match the predetermined number of input channels of the system are then generated. An assignment of each BMF signal to a system input channel is then executed. Plant-friendliness criteria corresponding to a plurality of system outputs are selected and expected initial values corresponding to the plurality of system outputs are determined. The approximate steady-state gains corresponding to the plurality of system outputs with respect to the input channels are then determined. A set of amplitudes for the BMF signals is selected.

A simplified model of the system responses for the system outputs is determined based on: the system settling time; the steady-state gains corresponding to the plurality of system outputs with respect to the system inputs; and linear dynamics of at least one predetermined order. The effect of the excitation of the input channels via the BMF signals on the system outputs is then simulated using this simplified system model and the resulting simulated responses are judged based on the plant-friendliness criteria. If the simulated system responses are judged to exceed the plant-friendliness criteria, then the assignment of BMF signals to input channels and/or the amplitude of at least one BMF signal are changed, based on the judging of the simulation results and the simulation is repeated. Alternatively, a series of optimization problems may be solved to determine a selected set of amplitudes of the BMF signals using the initial set of amplitudes, the simplified system model, the expected initial input and output values, the assignment of perturbation signals to input channels and the plant-friendliness criteria.

The optimization may also be solved for a set of perturbation signal assignments to input channels. For some of these assignments the optimization may be infeasible within the constraints imposed. This means that these assignments do not satisfy plant-friendliness criteria. Thus, in one step the optimization may be able to determine infeasible assignments of perturbation signals to input channels and compute the optimal amplitudes for the feasible assignments. That combination of input assignments and amplitudes that excites the plant the most within the plant-friendliness requirements is then used in the plant test execution.

Yet another embodiment of the present invention is a method and apparatus for testing a system including a predetermined number of input channels and a plurality of output channels, for the purpose of obtaining a plurality of empirical models for the synthesis of a model-based controller. A plurality of nearly stochastically uncorrelated BMF signals to match the predetermined number of input channels of the system are then generated. The BMF signals are assigned to system input channels and are assigned amplitudes. A test of the system using these BMF signal assignments is then executed and a plurality of output signals generated on the plurality of output channels during the test are collected. Interactions between the plurality of output signals are judged. A first set of the empirical models representing output signals judged to be substantially interacting is generated. This first set of the empirical models is generated using multi-input multi-output (MIMO) parametric modeling tools and based on the BMF signal assignments and the output signals collected. A second set of the empirical models representing output signals judged not to be substantially interacting are then generated. This second set of the empirical models is generated using multi-input single-output (MISO) parametric modeling tools and based on the BMF signal assignments and the output signals collected.

Still another embodiment of the present invention is a method and apparatus for designing perturbation signals to excite input channels of a system, in order to test that system for the purpose of obtaining models for the synthesis of a model-based controller. This exemplary method begins with the step of providing input parameters of the system, including selecting a settling time, a dominant time constant, an estimated first signal amplitude, an estimated second signal amplitude, plant-friendliness criteria of the system, and an estimated frequency spectrum for the test signals. A plurality of BMF signals are then generated based on these input parameters and the frequency spectra of these BMF signals are calculated. Based on the match between the signal frequency spectra of the BMF signals and the input parameters, a set of the BMF signals is selected which have substantially 100% useful power. One of the BMF signals from this set of BMF signals is selected out for which the frequency spectrum most closely matches the estimated frequency spectrum for the test signals. The selected BMF signal is then used as a first perturbation signal for testing the system and the first test signal amplitude is set to the estimated first signal amplitude. The selected BMF signal is also shifted by a one settling time of the system. The delayed BMF signal is then used as a second perturbation signal for system testing and the second test signal amplitude is set to the estimated second signal amplitude.

Responses of the system are simulated using the first test signal and the second test signal. The resulting responses are judged based on the plant-friendliness criteria. If the responses are judged to exceed the plant-friendliness criteria, then at least one of the first test signal amplitude and the second test signal amplitude are changed, based on the judging of the simulation responses and the simulation is repeated.

Yet a further embodiment of the present invention is a method and apparatus for designing perturbation signals to excite input channels of a system, in order to test that system for the purpose of obtaining models for the synthesis of a model-based controller. This exemplary method begins with the step of providing input parameters of the system, including selecting an estimated first signal amplitude, an estimated second signal amplitude, and plant-friendliness criteria of the system. A first test signal and a second test signal, which are nearly stochastically uncorrelated are also provided. The first test signal amplitude is set to the estimated first signal amplitude and the second test signal amplitude is set to the estimated second signal amplitude.

Responses of the system are simulated using the first test signal and the second test signal. The resulting responses are judged based on the plant-friendliness criteria. If the responses are judged to exceed the plant-friendliness criteria, then at least one of the first test signal amplitude and the second test signal amplitude are changed, based on the judging of the simulation responses and the simulation is repeated.

DETAILED DESCRIPTION OF THE INVENTION

Figure 1A:
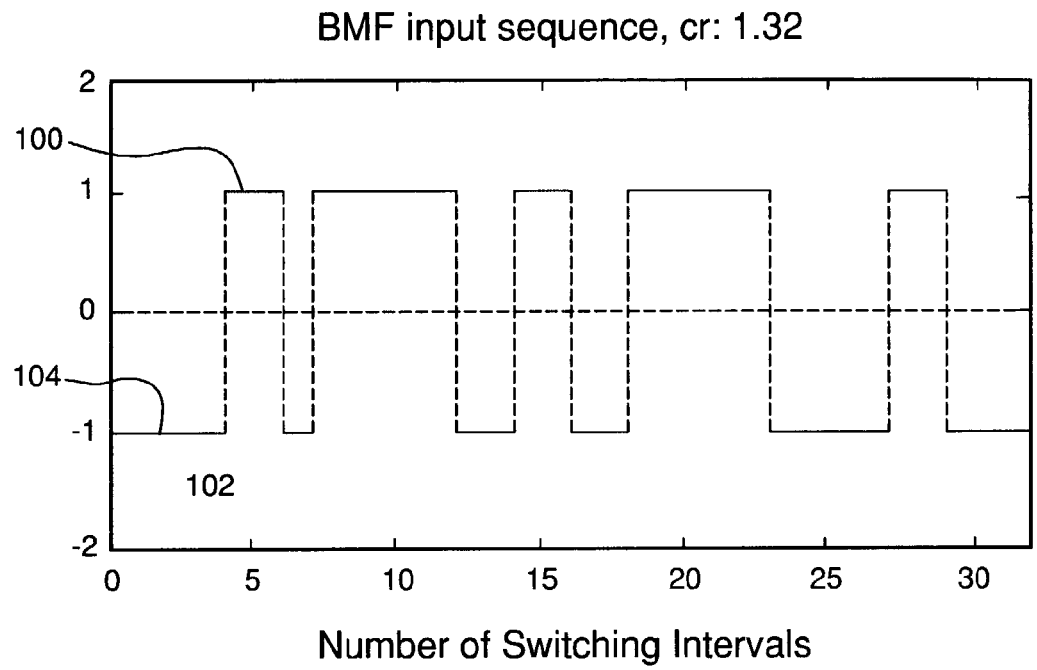
FIG. 1A is a graph illustrating an exemplary BMF signal.

The present invention involves the design of a fast plant test to obtain a system model for model-based control of a system, such as an air separation unit (ASU), hydrogen carbon monoxide (HyCO) facility, or a natural gas liquefaction (LNG) plant, which has multiple input (manipulated) channels and multiple output (controlled) channels. An exemplary system is shown as plant 320 in FIG. 3. It is understood that other chemical plants, such as petro-chemical plants, or other complex systems, including electronic and mechanical systems, to be desirably operated via a model-based controller may also be tested according to the present invention.

One important consideration in such a test is the generation of perturbation signals used to test the response of the system to perturbation of its input levels. *Perturbation Signals for System Identification*, edited by K. Godfrey, Prentice Hall International, Ltd., 1994, provides general background on perturbation signal design for model development based on plant data and is herein incorporated by reference.

Preferably, the perturbation signals should be persistently exciting to the system to help decrease the time needed to conduct the test of the system. Another consideration is that the signal amplitude should desirably be large enough to provide a sufficient signal to noise ratio (S/N) for the system response to be determined from the output. The signal amplitudes are preferably not so large that the output levels are driven outside of acceptable limits, though. Additionally, in a multi-variable plant test, the interaction between the simultaneous perturbation of several input channels may affect the output levels. This means that to help ensure a plant-friendly test, in which the output levels remain within acceptable limits, it may be desirable to test potential perturbation signals on a simplified model of the plant before actual testing.

Also, it is desirable for the various perturbation signals to be substantially stochastically uncorrelated with respect to one another, thereby allowing simpler and potentially more precise analysis of the test data. Additionally, it is desirable for the perturbation signal to span the control-relevant bandwidth of the system being tested. It is also desirable for the power of the perturbation signal to be concentrated and well distributed within the control-relevant frequency window of the system.

Binary Multi-Frequency Signals

An exemplary class of signals, which may be used as perturbation signals, are binary multi-frequency (BMF) signals. The creation of BMF signals was first described by A. Van den Bos in *Construction of Binary Multifrequency Test Signals* from the 1st IFAC Symposium on Identification in Automatic Control Systems, Prague (1967). Van den Bos, with R. G. Krol, presented further BMF signal designs in *Synthesis of Discrete-Interval Binary Signals with Specified Fourier Amplitude Spectra*, International Journal of Control, 30 (1970), which allow BMF signals to be created with user specified frequency spectrum across a number of harmonics. M. R. Buckner and T. W. Kerlin also discuss designs for BMF signals in *Optimal Binary Signals for Reactor Frequency Response Measurements*, Nuclear Science and Engineering, 49 (1972). Buckner and Kerlin were able to create two uncorrelated BMF signals by generating one BMF signal based on even harmonics only and one BMF signal based on odd harmonics only. Using this approach only two stochastically uncorrelated BMF signals may be generated.

FIG. 1A is an amplitude versus number of switching intervals graph illustrating an exemplary BMF signal. The graph shows one period of this periodic signal. The signal varies between upper level 100 and lower level 102. In the exemplary graph of FIG. 1A the BMF signal is shown centered on about zero with an amplitude of one arbitrary unit. Such an exemplary BMF signal may be used as a perturbation signal during a plant test to determine the response of a system to perturbations, such as a plant test for model-based control. During an exemplary fast plant test, the BMF signal may be centered on a predetermined initial input level and the amplitude may desirably be adjusted to provide a maximally exciting perturbation signal, while maintaining plant-friendly operation.

The bandwidth spanned by a BMF signal may be largely determined by two parameters, the switching time and the period. These parameters may be determined from the anticipated response of the system based on previous study (such as a dynamic simulation of the system, e.g.), observations of the plant or empirical data from the plant collected prior to plant test or experience with similar plants. The switching time, $T_{sw}$, of the BMF signal (i.e. the minimum time between level changes) is based on the dominant open-loop time constant, $\tau_{dom}$, of the system to be tested and should not be any longer than $\pi \tau_{dom}$. The desirably faster response of the system during closed-loop operation may shorten $T_{sw}$. The reduction of $T_{sw}$ may often be by a factor of 2 or 3, but this factor may be even greater if aggressive feedback control is desired and judged to be achievable.

The length of a BMF signal period, P, is based on the estimated settling time, $T_{ss}$, of the system to be tested and the switching time. For a first-order system, $\tau_{dom}=T_{ss}/5=T_{99\%}/5$, $\tau_{dom}=T_{97\%}/4$ and $\tau_{dom}=T_{95\%}/3$ (where $T_{n\%}$ represents the time that it takes to capture n % of the system response). These relationships may be extended for higher-order systems. To completely span the harmonics of the desired frequency window of the open-loop system, P is desirably at least $2\pi_T$ss. In the situation that only information regarding control-relevant frequencies is desired, the effective settling time, $T_{eff}$, i.e., the time that the system takes to respond to a disturbance within the control-relevant time scale, replaces the settling time in the equation for the signal period, and hence the BMF period may be shortened, often by a factor of 0.8 or 0.6. Also, the total number of switching times, N, in a single BMF signal period must be an integer. N is typically selected as an even number to ensure a BMF signal with zero mean, but such a selection is not necessary. Moreover, it may be preferable for N to be a power of two to ensure that there is no spectral leakage during fast Fourier transform (FFT) signal processing, which is often used as part of the test data analysis. The exemplary BMF signal in FIG. 1A includes 32 units of $T_{sw}$.

BMF signals are generated as frequency domain signals. Therefore, the use of BMF signals may allow for more precise control over the frequency spectra of the perturbation signals as compared to other exemplary classes of perturbation signals, such as PRBS or multi-level pseudo-random signals. Mathematical software packages, such as MATLAB®, include algorithms that may be used to generate BMF signals. The desired frequency window and frequency spectrum for an exemplary BMF signal may be specified during BMF signal generation. Although the frequency spectrum over the specified harmonics may be reasonably well controlled by this specification, it may not provide a desirable concentration of the BMF signal power within the specified frequency window.

Figure 1B:
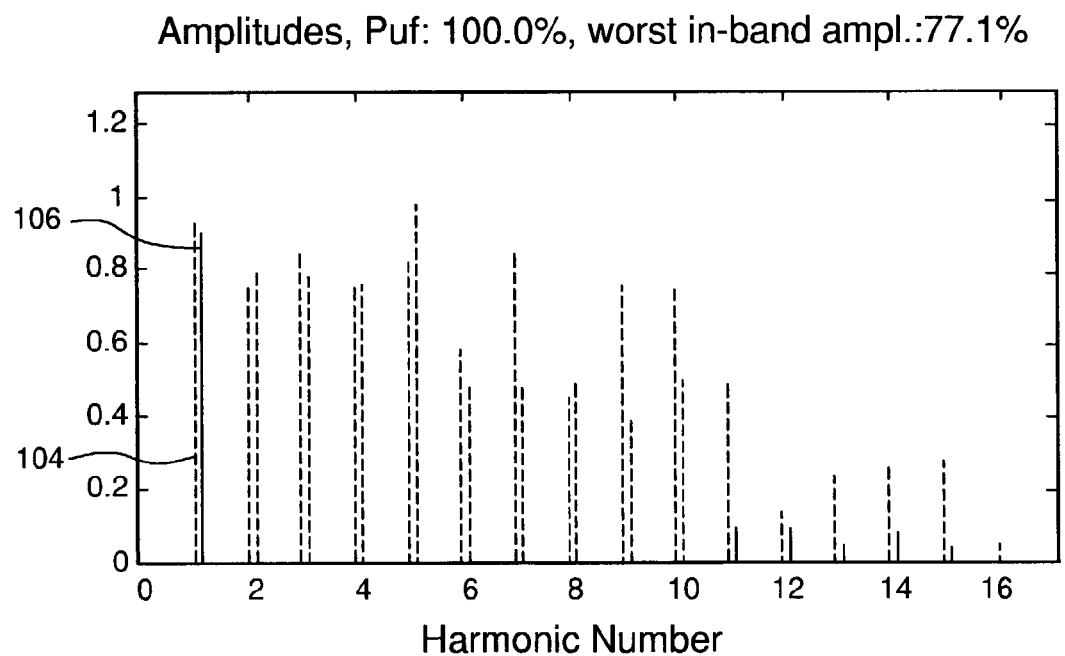
FIG. 1B is a graph illustrating the frequency spectrum of the exemplary BMF signal of FIG. 1A across a specified set of harmonics in a selected frequency window.

FIG. 1B illustrates frequency spectrum 104 of the exemplary BMF signal from FIG. 1A across a frequency window of sixteen harmonics. An exemplary desired frequency spectrum 106 used to generate the BMF signal is provided for reference. In an exemplary perturbation signal selection process, a number of BMF signal frequency spectra may be compared to the desired signal frequency spectrum. The selection of a particular BMF signal may be based on a weighted average of either the absolute differences or the squared differences between the BMF signal contribution at each harmonic and the desired contribution.

Figure 2A:
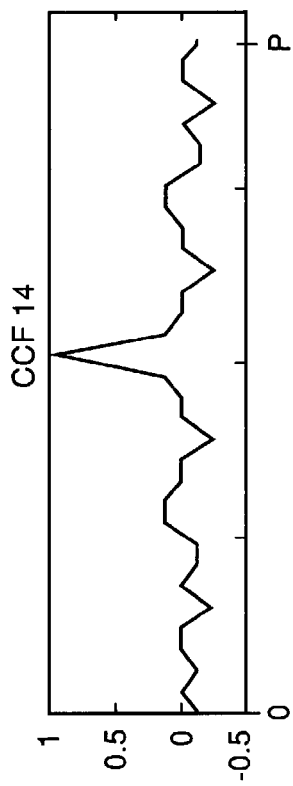
FIG. 2A is a graph illustrating the auto-correlation function (ACF) of the exemplary BMF signal of FIG. 1A.

FIG. 2A is a graph of the periodic auto-correlation function (ACF) of the exemplary BMF signal illustrated in FIG. 1A. It is noted that the ACF for BMF signals may be desirably selected to be non-biased and relatively close to zero for one signal period, P, as in this example. Generally the ratio between the peak value and the highest intermediate value is desirably greater than 5:1 in order to guarantee significant lack of correlation between input channels during one effective settling time.

Figure 2B:
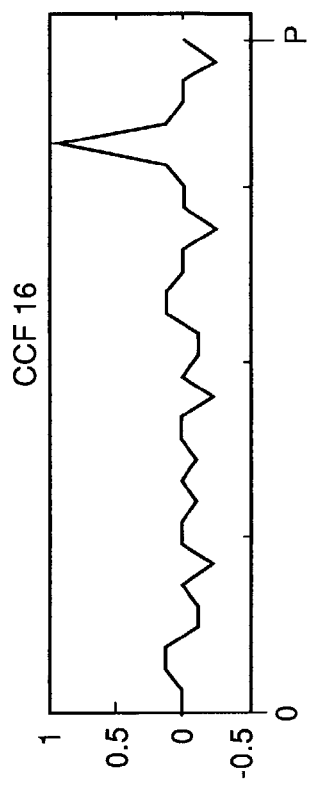
FIGS. 2B, 2C, and 2D are graphs illustrating the cross-correlation function (CCF) of the exemplary BMF signal of FIG. 1A with a delayed copy of itself.
Figure 2C:
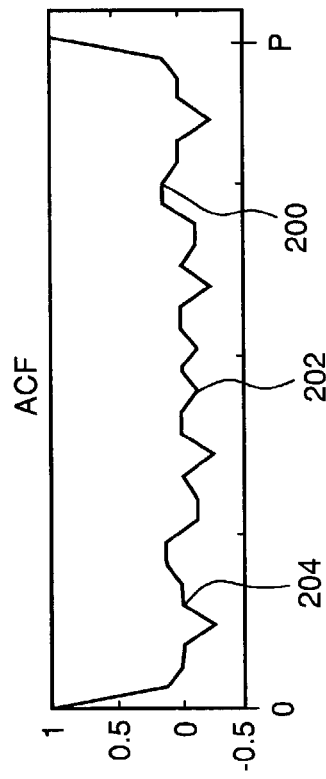
Figure 2D:
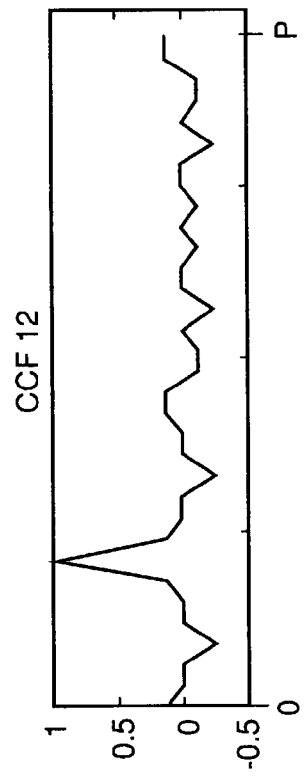

FIGS. 2B–D are graphs of the cross-correlation function (CCF) between the exemplary BMF signal of FIG. 1A and delayed copies of itself. These graphs necessarily appear similar to the ACF graph of FIG. 2A, except for a delay. The CCF in FIG. 2B corresponds to the ACF graph being delayed to start at point 200 in FIG. 2A. The CCF's in FIGS. 2C and 2D are delayed to correspond to graphs beginning at points 202 and 204, respectively. Therefore, the CCF's between an exemplary BMF signal and delayed copies of itself may be selected to be non-biased and nearly zero for the delay time. An exemplary set of delayed BMF signals may be created, each of which is delayed by a set amount from the previous signal in the set. This means that it is possible to create a set of nearly stochastically uncorrelated signals, by delaying a BMF signal.

In an exemplary test of system responses it is desirable for each successive BMF perturbation signal to be generated by delaying the previous signal by at least $T_{eff}$ (i.e. long enough that system responses have substantially settled within the control-relevant time scale before the cross-correlation between any of the signals becomes significant). If the minimum delay between any two of the signals is larger than $T_{eff}$, then the initial portion of the CCF, for times less than $T_{eff}$, between any two of the BMF signals in the exemplary set may be unbiased and nearly zero. It is also desirable for one period of the BMF signals to be at least as long as the maximum delay of any perturbation signal with respect to any other perturbation signal in the set plus $T_{eff}$.

Because the CCF between any pair of these input perturbation signals in the set may be desirably unbiased and nearly zero for at least one effective settling time, the deconvolution of input-output (I/O) relationships used to estimate the process dynamics is highly simplified.

The relationship between the desired maximum delay between any two perturbation signals and the period of the perturbation signals may impose an additional condition on the minimum BMF signal period. For example, if the number of input channels, m, is greater than six, then the minimum period of the BMF perturbation may be desirably increased to $mT_{eff}$.

It is also noted that, because that $T_{eff}$ represents how long the system may continue to respond to input signal excitation within the control-relevant time scale, it is desirable that output data obtained during the first $T_{eff}$ of the test be discarded and not used for test data analysis and that the test extend at least one effective settling time beyond a single BMF signal period, P. Therefore, the desired minimum duration of an exemplary test, $t_{test}$, of a multiple input system using nearly stochastically uncorrelated BMF signals may be given by Equation 1.

$$t_{test} = P + T_{eff} = (2\pi+1)T_{eff}, \text{ for } m \leq 6$$

$$t_{test} = P + T_{eff} = (m+1)T_{eff}, \text{ for } m > 6 \qquad \text{Equation 1}$$

Because $T_{eff}$ is based on the longest settling time of the system and the long-term characteristics of the process responses may not be control-relevant, shorter tests may be possible. Longer tests may be used to increase the S/N, and desirably improve test results, especially in the case of very noisy output signals due to process or sensor noise.

Overview

Figure 3:
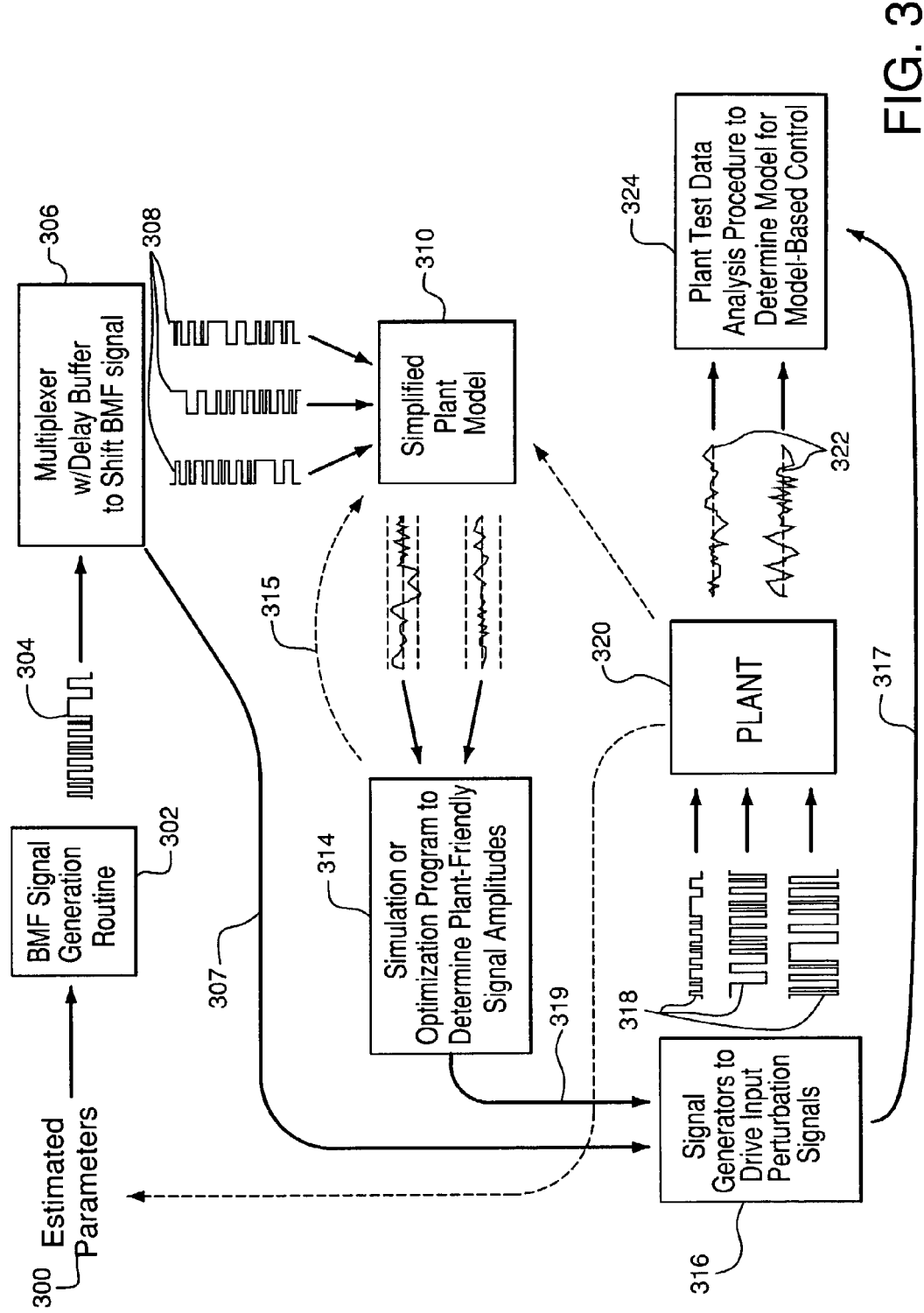
FIG. 3 is a block diagram overview of an exemplary fast plant test.

FIG. 3 is a block diagram which provides a high level overview of an exemplary plant test procedure to generate a model of the plant for model-based control. The starting point is to determine a set of nearly stochastically uncorrelated perturbation signals to use in the plant test. Although the exemplary block diagram of FIG. 3 describes an embodiment of the test procedure utilizing BMF perturbation signals, it is contemplated that other multivariable signals, such as pseudo-random binary signals, multi-level pseudo-random signals, or Schroeder-phased sinusoids, may be used as the perturbation signals instead. *Perturbation Signals for System Identification* discloses possible designs for pseudo-random binary and multi-level pseudo-random signals. Guidelines for design of multiple uncorrelated Schroeder-phased sinusoids were disclosed by D. E. Rivera in the notes of the short course, *Principles of System Identification* (1999), at Arizona State University, herein incorporated by reference.

Mother BMF signal 304 is generated by BMF signal generation routine 302, using estimated parameters 300. Estimated parameters 300 may be based on empirical observations of plant 320, as shown. Estimated parameters 300 may also be obtained from a dynamic simulation of the plant (if one exists) or from experience based on other plants of a similar nature. It is desirable that a number of BMF signals are generated by BMF signal generation routine 302 and then one mother BMF signal 304 is selected from this group of prospective BMF perturbation signals. The selection of mother BMF signal 304 is desirably based on estimated parameters 300 and is discussed in greater detail with regard to FIG. 4, below.

Selected mother BMF signal 304 is used to generate nearly stochastically uncorrelated, delayed BMF signals 308. An exemplary method of generating these delayed BMF signals is to use multiplexer with delay buffers 306. The mother BMF signal is replicated a number of times, all but one of the originated signals are then loaded into the delay buffers. Each delay buffer would delay the signal a predetermined time, preferably 1 $T_{eff}$ in the first buffer, 2 $T_{eff}$ in the second buffer, etc. The predetermined delay time is preferably an integral number of samples, or switching times to simplify and improve the accuracy of the test analysis, but the amount of samples of delay may be non-integral. That is naturally equivalent to using a modified sampling time of which the delay time is an integral multiple. Selecting a sampling time that satisfies this condition and using it to sample both input and output signals during the plant test is important to avoid aliasing. Alternatively, other methods, such as a software program running on a general purpose computer or an iterative delay process in which the most recently generated perturbation signal is copied and delayed a set amount to generate the next perturbation signal, may be used to generate delayed BMF signals 308.

In FIG. 3, two delayed BMF signals 308 are shown, providing perturbation signals for a plant having three input channels. The example of three input signals is only for ease of illustration. The number of input channels is preferably determined by the scope of the model-based controller. Additional input channels may increase the complexity of plant test data analysis procedure 324, and may increase the minimum test time as described above in Equation 1. In one example of an air separation facility, the number of input channels may be between eight and ten. Even greater numbers of input channels may be used, depending on the scope of the model-based controller.

Once enough perturbation signals are generated, these signals are assigned to input channels and initial estimated input signal amplitudes are selected. The perturbation signals are then tested as inputs for simplified model of the plant 310. Simplified model of the plant 310 is desirably based on a priori knowledge about plant 320, as shown. This a priori plant knowledge may include: plant data; a dynamic simulation of the plant; and plant operator/engineer knowledge. Additionally, criteria for plant-friendliness may be developed from this a priori knowledge. Development of simplified model of the plant 310 is described in detail below with regard to FIGS. 6 and 7.

Simplified model of the plant 310 generates estimated output signals 312, which correspond to plant output signals 322. The number of output channels is preferably determined by the scope of the model-based controller. In the exemplary overview of FIG. 3, two plant output signals 322, and two corresponding estimated output signals 312, are shown. The selection of two output channels is for illustration purposes only. The number of output channels may be, for example, between 20 and 25 for an air separation plant, but even greater numbers of output channels may be desired. Additional output channels may increase the complexity and duration of plant test data analysis procedure 324.

The use of simplified model of the plant 310 desirably serves two functions, helping to ensure plant-friendliness of the test and helping to attain maximum system excitation during the test. Plant-friendliness is an important consideration for a plant test. If outputs in the plant are excited beyond certain levels by plant-unfriendly perturbation input signals during a plant test, safety and/or product specification constraints may be violated. Therefore, it is desirable to ensure that a proposed plant test is plant-friendly before the actual plant test. Such plant-unfriendliness may result from several causes, including an input perturbation signal with too large of an amplitude, or interactions between the perturbation signals exciting two or more input channels. Plant-friendliness criteria may be established for estimated output signals 312 of simplified model of the plant 310, as illustrated by the dashed lines in the plots of estimated output signals 312. As long as the estimated output signals 312 remain within these criteria, the resulting exemplary plant test is likely to be plant-friendly.

It is possible for the input perturbation signal amplitudes to be set small enough for plant-friendliness to be substantially guaranteed, but such a test may not significantly excite the system. Greater excitation of the system during testing is desirable to increase the S/N for the output channels, thereby simplifying analysis of the test results. By using simplified model of the plant 310 to assess the proposed plant test, the system excitation may be determined. The higher the S/N, the fewer number of test cycles that it may be desirable to average together in order to obtain a reliable control-relevant model of the plant. Therefore, maximizing S/N may decrease the time required to run the open-loop plant test. It is contemplated that two or three test cycles may be desirable to help reduce the effect of noise on the test data analysis depending on the degree of noise found in the output signals.

In simulation mode, simulation or optimization program 314 first determines if any of estimated output signals 312 has exceeded the plant-friendliness criteria. Estimated output signals 312 may be monitored to determine the expected system excitation and, therefore, the estimated plant-friendliness of a particular set of input perturbation signals and assigned amplitudes. This may involve an iterative process with newly estimated input perturbation signal amplitudes and assignments 315 being sent back to simplified model of the plant 310 and tested. The newly estimated output signals 312 are analyzed and the process repeated until an appropriately exciting, plant-friendly set of input perturbation signals is determined.

In optimization mode, simulation or optimization program 314 may calculate optimal input perturbation signal amplitudes for a set of input signal assignment options provided. The optimization mode of simulation or optimization program 314 may be a self-contained optimization routine, which determines input perturbation signal amplitudes and assignments based on simplified model of the plant 310, which may be embedded in the optimization routine. Thus, the optimization may be a one step procedure.

Once the desired amplitudes and assignments of input perturbation signals 318 have been determined, data representing the amplitudes and assignments of the input perturbation signals are supplied to signal generators 316 on data channel 315 and data representing the signal shapes, such as the time delays between the binary levels, is supplied to signal generators 316 on data channel 307. Data transfer in FIG. 3 is characterized as transmission over a data channel for ease of illustration, but it is contemplated that the data transfer may alternatively be accomplished via a computer download or the physical transfer of memory devices such as tape, disk, or IC recording media. The data transfer may also involve entering settings on the signal generators manually from printed or electronically transmitted information.

Assuming that the plant is operated near its normal operating conditions at the time of plant testing, perturbation signals 318 provide data representing deviations from the values of the input (manipulated) variable from these normal operating conditions. Output signals 322 from the output, controlled, channels of plant 320 are measured by sensors within the plant and stored for analysis by plant test data analysis procedure 324.

Data representing perturbation signals 318 are supplied to plant test data analysis procedure 324 from signal generators 316 on data channel 317. Desirably, using physical insight into the system, the output channels may be separated into sets of highly interacting output channels. The sets of highly interacting output channels contain output signals of the system that exhibit a significant degree of interdependence. Data from these channels are preferably analyzed together using a multiple input/multiple output (MIMO) sub-space identification method or an auto-regressive exogenous (ARX) algorithm. Data from output channels exhibiting less interaction with other output channels may be analyzed separately using simpler multiple input/single output (MISO) parametric models (state-space, ARX, ARMAX, output-error, Box-Jenkins, etc.). The use of these various models is described in detail below with respect to FIG. 10.

Figure 4:
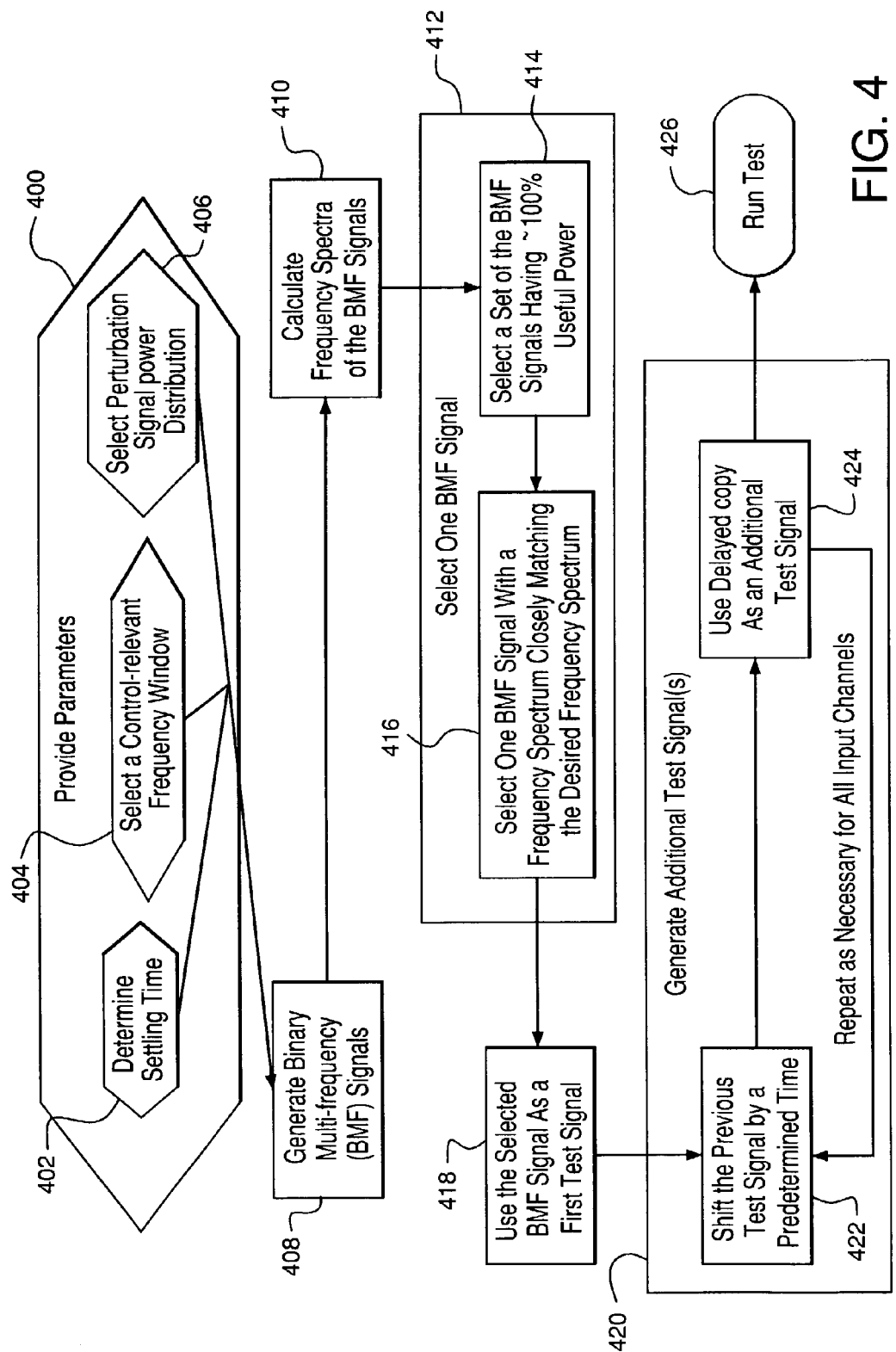
FIG. 4 is a flowchart illustrating an exemplary method of generating a set of nearly stochastically uncorrelated BMF perturbation signals.

Detailed Description of the Flowchart of FIG. 4

FIG. 4 is a flowchart illustrating an exemplary method for generating BMF input perturbation signals for use in a fast plant test to create a model of the plant for model-based control of that plant. Several parameters used to generate the signals are provided, step 400. These parameters are determined based on a priori knowledge of the system to be tested. These parameters may be based on empirical observations of the system, or, alternatively, may be obtained from a dynamic simulation of the plant (if one exists) or from experience based on other plants of a similar nature. For existing plants empirical data derived from plant operation is often preferable, due to the complexity of the systems generally considered. In the case of upgrading the control system of a plant that is already in operation and has been subjected to a number of control systems in the past, the experiences of plant operators and long-term data from previous control systems may provide significant amounts of empirical data from which the input perturbation signal parameters may be determined.

The parameters provided in step 400 preferably include the settling time of the system, a control-relevant frequency window for the perturbation signals, and a frequency spectrum for the perturbation signals over the harmonics of the selected frequency window. The effective settling time, $T_{eff}$, is determined, step 402, based on the time constants of the various outputs of the system and the aggressiveness of the model-based control controller being designed for the system. $T_{eff}$ is the length of time during which a system may still be reacting to a significant degree to a perturbation after the perturbation has occurred within a control-relevant time scale. The focus for determining $T_{eff}$ is, therefore, on the output of the system which has the longest time constant. The settling time for an open-loop, first-order system may be defined to be equal to five times the longest process time constant in the system. In a closed-loop system, such as a system operating under model-based control, though, the settling time may be significantly shorter than the open-loop settling time due to the effect of feedback from the controller, which preferably tends to restore the system to the desired optimum operating state more rapidly. The exemplary method of FIG. 4 is designed to create a set of nearly stochastically uncorrelated BMF perturbation signals for use as part of an exemplary fast plant test. Because the purpose of this exemplary plant test is to create a control-relevant model of the plant for model-based control, the effective settling time parameter determined in step 402 may be shortened substantially from the open-loop settling time, depending on the aggressiveness of the desired model-based control feedback. In many cases, $T_{eff}$ may be 60% of the open-loop settling time.

A control relevant frequency window is also selected, step 404. This frequency window is desirably selected to span the control-relevant frequencies of the system. The lowest frequency captured in this frequency window, $v_{low}$, is equal to the inverse of the BMF signal period. The minimum period of the BMF signal, P, and hence the maximum $v_{low}$, is related to $T_{eff}$ as described in Equation 1. The highest frequency captured in this frequency window, $v_{high}$, is limited by the Nyquist frequency of the BMF signal determined by the switching time, $T_{sw}$, as shown in Equation 2.

$$v_{high} \leq v_{Nyquist} \Rightarrow \frac{\alpha}{\tau_{dom}} \leq \frac{\pi}{T_{sw}} \qquad \text{Equation 2}$$

Where $\alpha$ is a factor that represents the speed of the closed-loop response as a multiple of the open-loop response. $\alpha$ is typically 2 or 3, but may be even higher. Feedback control generally shortens the response time of the system and, therefore, it is preferable for $v_{high}$ to be correspondingly increased compared to the high limit on the bandwidth of the open-loop system. This preferable increase in $v_{high}$ is often by a factor of two or three, but may be even higher, depending on the aggressiveness of the feedback control desired and achievable.

After the control-relevant frequency window has been selected in step 404, a desired perturbation signal frequency spectrum across harmonics within the frequency window is selected, step 406. The signal power is distributed over at most (N–1) harmonics. An exemplary desired perturbation signal frequency spectrum 106 for N=16 is illustrated in FIG. 1B. The desired power in each harmonic may be based on empiric plant knowledge that provides insight regarding the importance of anticipated responses in certain frequency ranges. The desired frequency spectrum may focus largely on harmonics in a certain range, such as low frequency perturbations, as shown in FIG. 1B, or may distribute the power of the perturbation signal substantially equally among all of the harmonics.

A number of trial BMF signals are generated, step 408, using the parameters provided in step 400. Commercial mathematical software packages, such as MATLAB®, may include algorithms to generate BMF signals, which may be used for step 408. Alternatively, a special purpose software program may be written or special purpose circuitry may be designed to generate BMF signals. The number of trial BMF signals generated may be determined by the user, but may typically be in the range of 20–50. The greater the number of trial BMF signals generated the more likely it is that a signal with a frequency spectrum closely matching the desired frequency spectrum of step 406 will be generated. Generating a greater number of trial BMF signals may also result in a closer final match for the signal finally selected in step 416. Alternatively, trial BMF signals may be generated one at a time and tested until one signal is found to have a frequency spectrum desirably close enough to the desired frequency spectrum of step 406.

The frequency spectra of the trial BMF signals generated in step 408 are calculated, step 410. These spectra are used to select one of the trial BMF signals as a mother BMF signal for an exemplary plant test, step 412. One exemplary method of selecting this mother BMF signal based on maximizing the useful power of the signal for an acceptably low crest factor is shown in steps 414 and 416 of FIG. 4. It is contemplated that other methods of selecting a mother BMF signal, such as minimizing the signal crest factor for an acceptably high useful signal power may be used, as well. Lowering the crest factor tends to lower the useful power as well. Therefore, a good compromise between high useful signal power and low crest factor is a challenge in designing BMF signals. It is desirable for the crest factor of the perturbation signal to be as low as possible to maximize process excitation for a given signal amplitude, but it is also desirable to maximize the useful power percentage to avoid wasting signal power outside the frequency window of interest and to improve the S/N of the output signals during the plant test. If the crest factor is minimized without regard to the loss of useful power, a test running for the same amount of time as a test having a higher useful power percentage may capture less information which may lead to less accurate models of the system. Therefore, it may be desirable to maintain at least a minimum percentage of useful power (perhaps 90%) when selecting a mother BMF signal by minimizing the crest factor.

In the exemplary mother BMF signal selection method of FIG. 4, the set of trial BMF signals is reduced to a sub-set of only those signals which have 100% useful power and may additionally be selected to have a minimal crest factor for the initial random seeds. It is typically possible to select a number of signals from an exemplary set of trial BMF signals with 100% useful power and, therefore, the exemplary method of FIG. 4 uses the criterion of 100% useful power for selection in step 414, but it is contemplated that it may be desirable to select a sub-set of signals with as low as 90% useful power and then further select from the sub-set for minimum crest factors.

Out of the sub-set of trial BMF signals meeting the criterion of step 414, one mother BMF signal is selected which most closely matches the desired frequency spectrum of step 406. The selection of the mother BMF signal may be based on a weighted average of either the absolute differences or the squared differences between the contribution at each harmonic of the trial BMF signals in the sub-set of signals selected in step 414 and the desired contribution from the desired frequency spectrum of step 406.

The selected mother BMF signal may be assigned as the perturbation test signal for the first input channel of the system to be tested, step 418. This initial assignment may be changed to improve the plant-friendliness of the test, as described below with reference to FIGS. 7 and 9.

The selected mother BMF signal is also used to generate additional nearly stochastically uncorrelated BMF perturbation signals for other input channels, step 420 in the exemplary method of FIG. 4. The first additional perturbation signal in this exemplary method may be generated by delaying the mother BMF signal by the effective settling time, $T_{eff}$, step 422. The additional perturbation signal may then be assigned as the perturbation test signal for the next input channel of the system to be tested, step 424. Like the assignment of the mother BMF signal to the first input channel, this initial channel assignment may also be changed to improve the plant-friendliness of the test, as described below with reference to FIGS. 7 and 9. Steps 420 and 422 are repeated as necessary until nearly stochastically uncorrelated BMF perturbation signals have been generated for all of the input channels. Each new exemplary perturbation signal may be delayed from the previously generated signal by $T_{eff}$ in this example.

An exemplary method of generating these delayed BMF signals, described with respect to FIG. 3, is to use a multiplexer with delay buffers. The mother BMF signal may be replicated a number of times, all but one of the originated signals are then loaded into the delay buffers. Each delay buffer would delay the signal a predetermined time, preferably 1 $T_{eff}$ in the first buffer, 2 $T_{eff}$ in the second buffer, etc. Alternatively, other methods, such as a software program running on a general purpose computer or an iterative delay process in which the most recently generated perturbation signal is copied and delayed a set amount to generate the next perturbation signal, may be used to generate delayed BMF signals.

As illustrated in FIGS. 2B–D, a portion of the CCF between a BMF signal and a delayed copy of itself from zero up to the delay time is unbiased and nearly zero. Therefore, two exemplary signals, for example, the mother BMF signal and its first delayed copy, are nearly stochastically uncorrelated for responses that occur within the delay time between these signals. Preferably the delay is longer than the effective settling time of the system, $T_{\mathit{eff}}$. It is also desirable for the period of the BMF signals to be at least $T_{\mathit{eff}}$ longer than the longest delay between any two of the signals.

Shorter time delays than $T_{\mathit{eff}}$ may be possible, but these shorter inter-signal delays may only be desirable in situations where the effective settling time is based on the time constant of a minority of outputs that may be less important to the model-based control of the plant. It may be preferable to reduce $T_{\mathit{eff}}$ in such a case instead. Longer delays than $T_{\mathit{eff}}$ may be used to further reduce any stochastic correlation of the perturbation signals, but this may increase the total test time. The minimum test time shown in Equation 1 assumes that each BMF perturbation signal is delayed from the preceding perturbation signal by $T_{\mathit{eff}}$. If the inter-signal delay, $T_{\mathit{delay}}$, is larger than $T_{\mathit{eff}}$, then the minimum test time becomes the greater of $(2\pi+1)T_{\mathit{delay}}$ and $(m+1)T_{\mathit{delay}}$. It may also be desirable to vary the time delays to produce longer or shorter delays between specific pairs of perturbation signals if greater or less interaction is anticipated between the input channels to which those signals are to be assigned.

Once the set of nearly stochastically uncorrelated BMF perturbation signals has been generated and assigned to input channels of the system, an exemplary fast plant test of the system being studied is run, step 426.

Figure 5:
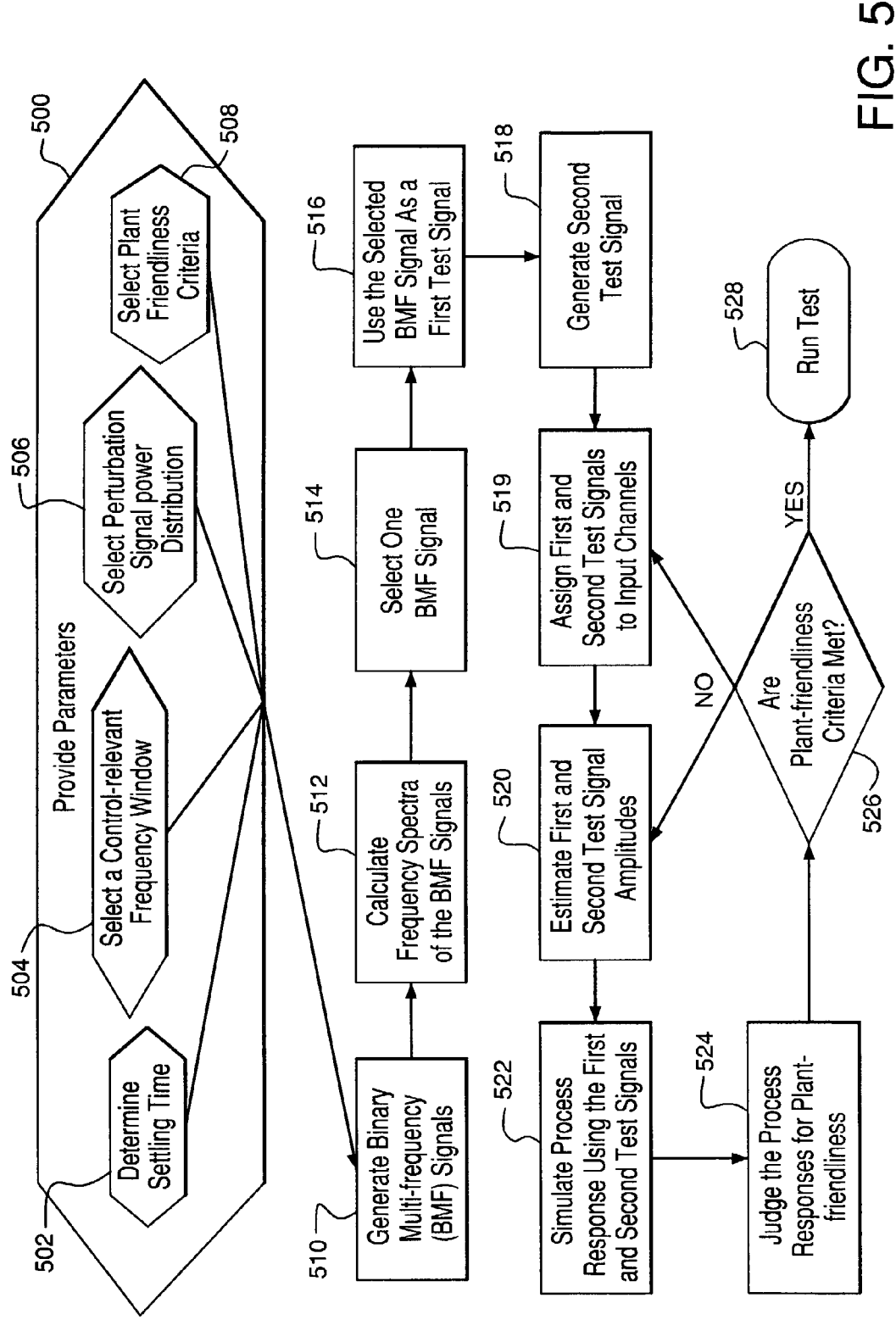
FIG. 5 is a flowchart illustrating an exemplary method of generating a set of plant-friendly BMF perturbation signals.

Detailed Description of the Flowchart of FIG. 5

FIG. 5 illustrates an exemplary method for generating plant-friendly BMF input perturbation signals for use in a fast plant test to create a model of the plant for model-based control of that plant. Several parameters used to generate the signals are provided, step 500. As in the exemplary method of FIG. 4, these parameters are determined based on a priori knowledge of the system to be tested. Providing the parameters in step 500 preferably includes determining a settling time of the system, step 502, selecting a control-relevant frequency window for the perturbation signals, step 504, and selecting a desired frequency spectrum for the perturbation signals over the harmonics of the chosen frequency window, step 506. These three parameters are determined using procedures and considerations similar to those disclosed for step 400 of the exemplary method of FIG. 4, above.

Additionally, criteria used to determine the plant-friendliness of an exemplary plant test are selected, step 508. The plant-friendliness criteria are desirably selected to provide a margin of safety for the operation of the plant during the exemplary plant test. Also, the plant-friendliness criteria may be selected to maintain reasonably normal production levels during the exemplary plant test. These criteria may include upper and lower bounds for individual output channel signal levels, which may constitute temperatures, pressures, flow rates, current, voltages, etc. of the system, as well as upper and lower bounds for particular functions of the output channel signal levels, such as the average of temperatures from stages of a distillation column, pressure differences in the flowsheet, etc.

Once the parameters have been provided in step 500, a set of trial BMF signals are generated, step 510, and the frequency spectra of these trial BMF signals are calculated, step 512. This set of trial BMF signals and corresponding frequency spectra may be generated by any of the methods described previously with respect to the exemplary method of FIG. 4. The set of trial BMF signals and corresponding frequency spectra are then compared to the desired perturbation signal frequency spectrum selected in step 506 over the harmonics of the frequency window chosen in step 504 to select a mother BMF signal, step 514, and assign this signal as the perturbation signal for the first input channel, step 516. The selection of the mother BMF signal from the set of trial BMF signals may be performed by the methods described previously with respect to the exemplary method of FIG. 4 as well.

The mother BMF signal selected in step 514 may also be used to generate a second perturbation test signal for a second input channel of the system, step 518, by delaying the mother BMF signal as described above with respect to FIG. 4. Alternatively, another signal from the set of remaining trial BMF signals may be selected by the methods used in step 514 to select the mother BMF signal. The CCF between this newly selected signal and the mother BMF signal may be generated to determine the degree to which these two signals are stochastically correlated. New signals may be selected from the set of trial BMF signals until a pair of nearly stochastically uncorrelated BMF signals for one effective settling time of the system is found.

Another approach to create a pair of nearly stochastically uncorrelated BMF signals was disclosed by L. W. Bezanson and S. L. Harris in *Identification and Control of an Extender Using Multivariable Algorithms*, IEEE Proceedings, 133(4) (1986), based on the orthogonality of even and odd harmonics, herein incorporated by reference. An exemplary method based on this approach desirably involves creating two BMF signals, one having contributions over even harmonics only and one having contributions over odd harmonics only. Therefore, for a given signal period P and switching time $T_{sw}$ at most two statistically uncorrelated BMF signals may be generated.

It is noted that, although the exemplary method illustrated in FIG. 5 includes the use of two input channels, the number of input channels in the present invention is preferably determined based on the scope of the model-based controller to be designed for the system being tested and the exemplary choice of two input channels is merely for illustrative purposes. It may be understood by one skilled in the art that this exemplary method for generating plant-friendly BMF input perturbation signals for use in a fast plant test to create a model of the plant for model-based control of the plant may be practiced for greater numbers of input channels.

The first and second perturbation test signals are assigned to specific input channels, step 519. Initial amplitudes for the first and second perturbation test signals are estimated and assigned, step 520. These estimated amplitudes may be based on a priori empiric knowledge of the system being tested. The estimated amplitudes are desirably selected to provide perturbation signals, which are continuously exciting to the outputs of the system, while also maintaining plant-friendly operation of the plant.

The first and second perturbation test signals, and the corresponding estimated initial amplitudes are desirably used in a simplified model of the system to simulate the responses of various processes within the system to these perturbation signals, step 522. The simplified model may be programmed on a general purpose computer. An exemplary method for designing a simplified model of the system being tested is described below with respect to FIGS. 6 and 7. It is contemplated that models of processes used to design chemical plants or other complex systems for which model-based control may be desired may be used to create a simplified model for use in step 522 as well.

The simulated output signals of the simplified system model from step 522 are stored and judged, step 524, against the plant-friendliness criteria selected in step 508. The output signals may also be judged to ensure that the processes of the system are significantly excited during the exemplary simulated test to provide desirably high S/N within the plant-friendliness criteria. Once the output signals are analyzed, a decision, step 526, may be made on whether to run the exemplary plant test, step 528, or to return the exemplary method for generating plant-friendly BMF input perturbation signals for use in a fast plant test to either step 519 or step 520. The assignment of the perturbation signals may be changed in step 519 and/or new first and second input perturbation signal amplitude estimates may be calculated in step 520 based on the simulated process responses, as well as the previously used system knowledge, to better meet the plant-friendliness criteria. The test simulation may then be run again. New input perturbation signal amplitudes may also be calculated and tested in the simplified system model to create greater excitation of the outputs of the system, while maintaining plant-friendliness.

This use of a simplified model of the plant may desirably ensure that the input perturbation signals are plant-friendly, thereby increasing the safety of an exemplary plant test of the present invention. By using this exemplary method, it may also be possible to create a plant test that provides greater process excitation, without undue risk, by determining more optimal amplitudes for the input perturbation signals. It is contemplated that slowly increasing the amplitudes of exemplary perturbation test signals and carefully monitoring output signals from output channels of the plant during exemplary pre-testing may allow similar results. Simulating this exemplary pre-testing with a simplified system model allows greater latitude, as plant-unfriendly results that may prove harmful to the system in an actual test do not damage an exemplary simplified model.

Figure 6:
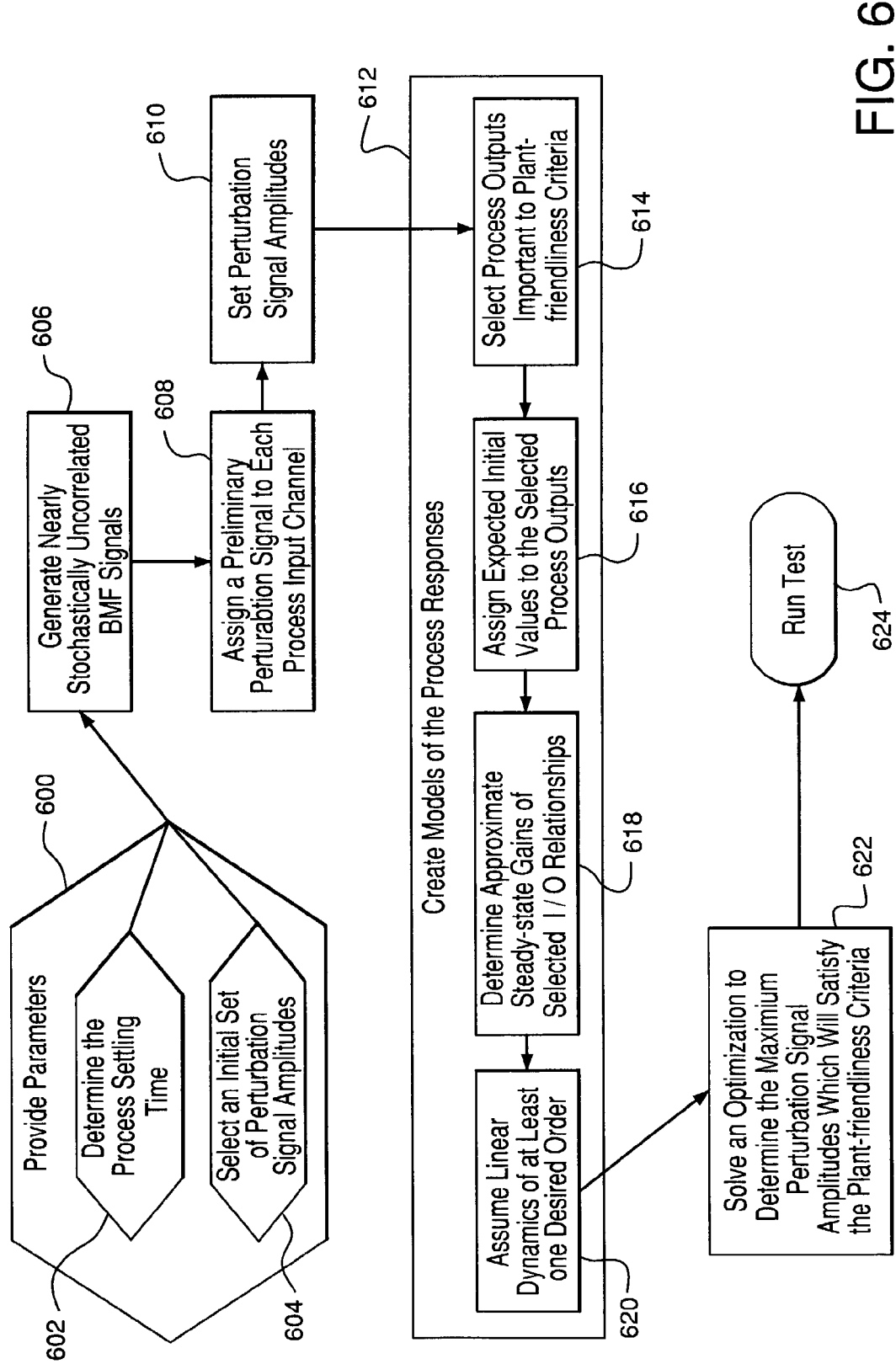
FIG. 6 is a flowchart illustrating an alternative exemplary method of generating a set of plant-friendly BMF perturbation signals.

Detailed Description of the Flowchart of FIG. 6

FIG. 6 illustrates another exemplary method for generating plant-friendly BMF input perturbation signals using a simplified system model to create a model of the system for the synthesis of a model-based control for that system. Parameters used to generate the signals are provided, step 600. As in the exemplary methods of FIGS. 4 and 5, these parameters are determined based on a priori knowledge of the system to be tested. Providing the parameters in step 600 preferably includes determining an effective settling time of the system, step 602. Other parameters such as a control-relevant frequency window for the perturbation signals, a desired frequency spectrum for the perturbation signals and plant-friendliness criteria may also be provided. These parameters may be determined using procedures and considerations similar to those disclosed as part of the exemplary methods of FIGS. 4 and 5, above.

Additionally, a set of initial amplitudes for input perturbation signals may be selected, step 604. The set includes one estimated amplitude corresponding to each input channel of the system to be tested. These estimated amplitudes may desirably be determined from a priori knowledge of the system to be tested and assigned to input channels based on this a priori knowledge.

Once the parameters have been provided in step 600, a set of nearly stochastically uncorrelated BMF perturbation signals are generated, step 606. This set of nearly stochastically uncorrelated BMF perturbation signals, also equal in number to the number of input channels, may be generated by any of the methods described previously with respect to the exemplary methods of FIGS. 4 and 5. Each perturbation signal is assigned to an input channel, step 608, and assigned a corresponding initial estimated amplitude from the set of initial amplitudes, step 610.

After the perturbation signals, with their corresponding estimated amplitudes, have been assigned to input channels, a simplified model of the process responses for the system being tested is created to test the desirability of this set of input perturbation signals and amplitudes, step 612. This simplified model of the plant is desirably based on the test parameters provided in step 600 and on a priori empiric knowledge of the processes making up the system.

Modeling fewer outputs may desirably simplify the model, but modeling too few outputs may create a simplified system model that does not provide an adequate simulation to ensure plant-friendliness. An exemplary simplified system model preferably focuses on only those outputs that are important to ensure plant-friendliness (e.g. the midpoint purity, GOX purity, oxygen and nitrogen in the sidearm, etc. for an air separation facility). Those output channels are selected from among the set of all of the process outputs of the system, step 614. The selected output channels may include the majority, or the entirety of the set of all output channels. Input/output (I/O) relationships between the input channels and the selected output channels, representing processes related to those input and output channels, desirably make up the simplified system model. Steady-state values for the output signals of the selected output channels are estimated, based on a priori empiric knowledge of the system operation. These values are assigned as initial values to the selected output channels of the simplified model, step 616. Steady-state input signal levels for the input channels may also be determined. Steady-state gains for the selected I/O relationships in step 618 may be estimated via, e.g., a rating mode steady-state simulation, a dynamic simulation, or from empirical data. In most cases, just the sign of the steady-state gains and the relative order of magnitude may be enough to be used in the simplified system model for plant-friendliness analysis. The simplified system model of the present method is contemplated to determine if proposed input perturbation signals may provide sufficient excitation of system outputs while maintaining plant-friendly operation. It is noted that the behavior of outputs of complex systems of the sort which may typically be the subject of the present exemplary method may also be strongly non-linear. Therefore, it is contemplated that the estimated steady-state gains determined in step 618 may only provide a crude idea of the sign and order of magnitude of actual steady-state gains of the outputs of the system, but this may still provide sufficient meaningful information for determining plant-friendly perturbation signal amplitudes.

These estimated steady-state gains may be formed into a crude, but meaningful, steady-state gain matrix of the system to be tested. It is desirable for the simplified system model to estimate the dynamic responses of the processes in the system. Many chemical, and other complex, processes behave locally (i.e. near a steady-state) like a second-order, or higher-order, linear process. By assuming linear dynamics of a desired order, the steady-state gain matrix may be used to create a simplified model of the dynamics of the system near the steady-state values, step 620. Equation 3 illustrates an exemplary first-order method for estimating the dynamic behavior, G(t), of the system based on the steady-state gain matrix, K:

$$G(t) = K\left(1 - e^{-\left(\frac{t}{\tau_{dom}}\right)}\right) \quad \text{Equation 3}$$

The matrix G(t) may be used as a simplified system model to determine plant-friendly amplitudes for input perturbation signals in an exemplary plant test. Higher-order models with time delays, inverse response or overshoot may provide more realistic estimates of system dynamics.

After the simplified model of the plant, G(t), has been created, an exemplary method of solving an optimization of this model, step 622, may be used in order to determine the maximum perturbation signal amplitudes that may satisfy plant-friendliness criteria. The input perturbation signals may change at every switching time, $T_{sw}$, and a period of the BMF perturbation signal contains N switching times. Therefore, it may be desirable to solve the optimization of the model G(t) N times with $t=T_{sw}$.

The vector amplitudes, $\lambda_i > 0$, i=1, 2, 3, . . . , m, for the m input channels desirably constitute the set of decision variables of the optimization. The optimization problem, which is solved for k=1, 2, 3, . . . , N, may be given by Equation 4:

$$\text{Objective Function:} \quad \max_{\lambda_i^k; i=1,2,3,\ldots,m}\left(\prod_{i=1}^{m}\lambda_i^k\right)$$

$$\text{Input Constraints:} \quad \Delta u_{\min} \leq \Lambda^k u^k \leq \Delta u_{\max}$$

$$\text{Output Constraints:} \quad \Delta y_{\min}^k \leq G(T_{sw})\Lambda^k u^k \equiv \Delta y^k \leq y_{\max}^k \quad \text{Equation 4}$$

where $\Lambda^k$ is an m×m diagonal matrix whose elements are input signal amplitudes $\lambda_i^k$ and $u^k$ is the m×1 combination of the m input moves at the $k^{th}$ delay (the $u^k$ vector is normalized so that it only contains elements equal to ±1). $u_{min}$ and $u_{max}$ are the minimum and maximum allowed input values, respectively. $\Delta u_{min}$ (defined as $u_{ss} - u_{min}$) and $\Delta u_{max}$ (defined as $u_{max} - u_{ss}$) are the minimum and maximum input deviation constraints with respect to the desired steady-state input value, $u_{ss}$, respectively. $y_{min}$ and $y_{max}$ are the minimum and maximum output constraints, respectively, which are desirably satisfied at all times (i.e. the plant-friendliness criteria for individual output channels). $\Delta y_{min}$ (defined as $y_{ss}^k - y_{min}$) and $\Delta y_{max}$ (defined as $y_{max} - y_{ss}^k$) are the minimum and maximum output deviation constraints with respect to the current output value, $y_{ss}^k$, respectively.

In practice, $u_{ss}$ and $y_{ss}^1$ are vectors of the input channel and output channel values corresponding to the start of the simulation. Because the input deviations of the perturbation signals are preferably made around the initial input channel steady-state values, $u_{ss}$, it may not be desirable to update this value. The values of the output channels, however, vary throughout the exemplary simulation, as well as during the plant test itself, in response to the input perturbations. Therefore the output constraints, $\Delta y_{min}$ and $\Delta y_{max}$, are preferably measured against updated values, $y_{ss}^k$.

An alternative embodiment of the optimization method is based on Equation 5. Because the objective function included in Equation 4 creates an optimization problem, which is non-linear, non-convex, and designed as a maximization, this optimization method may not be easily solved using commonly available commercial optimization software. Therefore, it may be desirable to reorganize the optimization problem into the convex minimization of Equation 5:

Objective Function:

$$\min_{\lambda_i^k; i=1,2,3,\ldots,m}\left[-\sum_{i=1}^{m}\ln(\lambda_i^k) = \sum_{i=1}^{m}\ln\left(\frac{1}{\lambda_i^k}\right)\right]$$

$$\text{Input Constraints:} \quad \Delta u_{\min} \leq \Lambda^k u^k \leq \Delta u_{\max}$$

$$\text{Output Constraints:} \quad \Delta y_{\min}^k \leq G(T_{sw})\Lambda^k u^k \equiv \Delta y^k \leq y_{\max}^k \quad \text{Equation 5}$$

This convex form of the objective function was disclosed by S. Boyd, L. E. Ghaoui, E. Feron, and V. Balakrishnan in *Linear Matrix Inequalities in System and Control Theory*, Studies in Applied Mathematics, v. 15 (1994). Casting a problem as a linear matrix inequality (LMI) guarantees a unique solution. The exemplary optimization problem in Equation 5 may not be placed in LMI format unless the linear input and output constraints are symmetric. Therefore, even though an exemplary optimization problem using Equation 5 is desirably convex, it may not be written as an LMI, but a solution may be determined using a convex solver, or a general non-linear solver available in mathematical software packages, such as MATLAB®. Alternatively a special purpose software solver or special purpose circuitry may be designed to carry out the optimization of either Equation 4 or Equation 5.

Once the optimization of the input perturbation signal amplitudes is completed, data describing the set of nearly stochastically uncorrelated BMF perturbation signals and corresponding optimized amplitudes may be used to generate input perturbation signals and conduct a test of the actual system, step 624.

Figure 7:
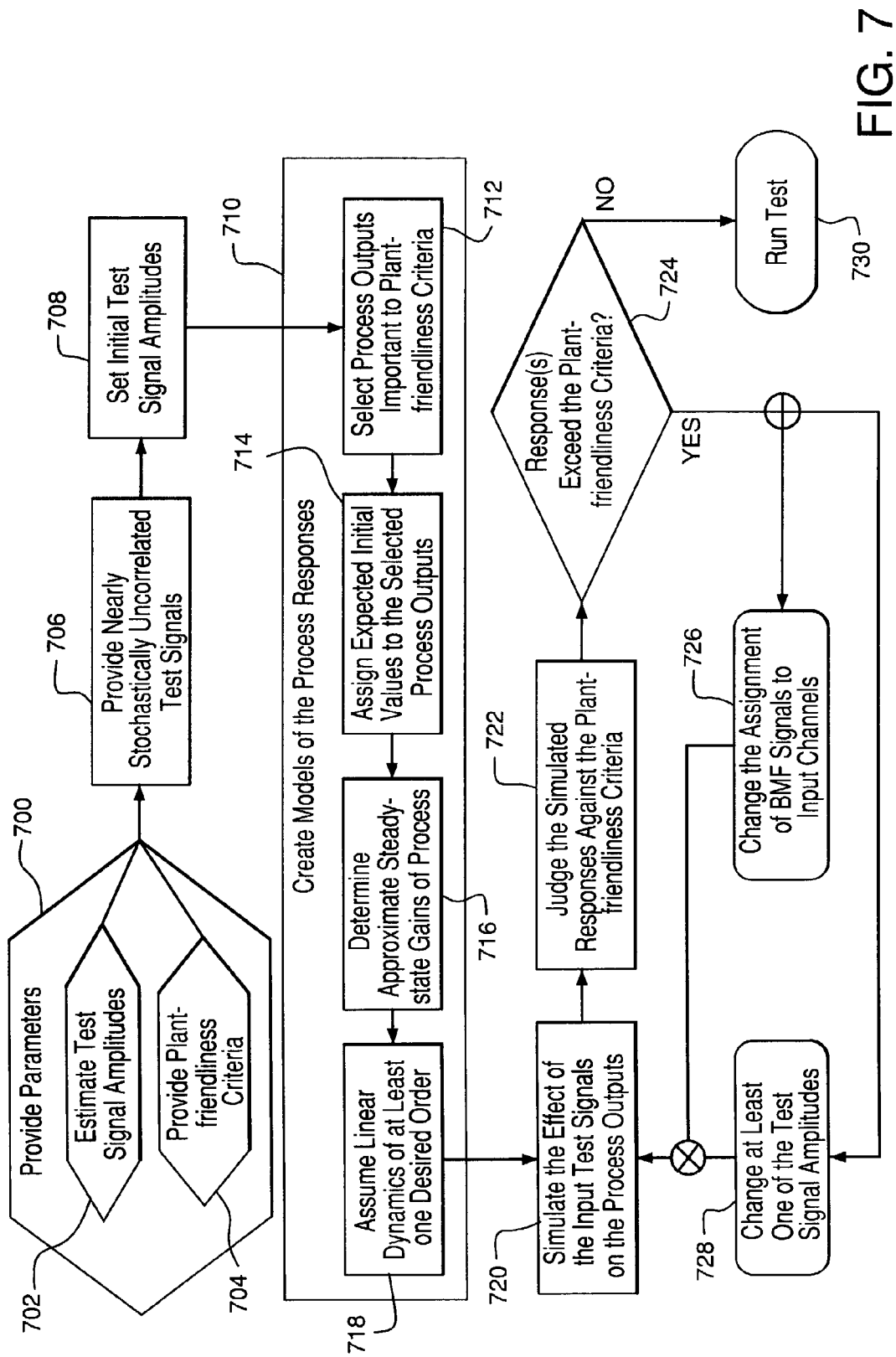
FIG. 7 is a flowchart illustrating an exemplary method of generating a set of nearly stochastically uncorrelated, plant-friendly perturbation signals.

Detailed Description of the Flowchart of FIG. 7

FIG. 7 illustrates a further exemplary method for generating plant-friendly input perturbation signals using a simplified system model to create a model for model-based control of the system. This exemplary method begins similarly to the exemplary method of FIG. 6. It is noted that the exemplary method of FIG. 7 is described in terms of a system having two input channels. The choice of two input channels is merely illustrative and one skilled in the art may understand that perturbation test signals for systems having other numbers of input channels may also be generated using the exemplary method of FIG. 7.

Parameters used to generate the signals are provided, steps 700, 702, and 704. As in the exemplary methods of FIGS. 4, 5, and 6, these parameters are determined based on a priori knowledge of the system to be tested. This knowledge may involve empirical data derived from plant operation or operation of similar plants. These parameters may be determined using procedures and considerations similar to those disclosed as part of the exemplary methods of FIGS. 4, 5, and 6, above.

Once the parameters have been provided in step 700, a set of two nearly stochastically uncorrelated perturbation signals are generated, step 706. These nearly stochastically uncorrelated perturbation signals, equal in number to the number of input channels, may include BMF signals, pseudo-random binary signals, multi-level pseudo-random signals, or Schroeder-phased sinusoids. Exemplary methods for generating nearly stochastically uncorrelated signals are described above with respect to FIGS. 3 and 4. Each perturbation signal is assigned to an input channel and assigned a corresponding initial estimated amplitude, step 708 from the set of initial amplitudes estimated in step 702.

After the perturbation signals, with their corresponding estimated amplitudes, have been assigned to input channels, a simplified model of the process responses for the system being tested is created to test the desirability of this set of input perturbation signals and amplitudes, step 710. This simplified model of the plant is desirably based on the test parameters provided in step 700 and on a priori empiric or first-principles based knowledge of the processes making up the system.

The exemplary simplified system model may be created using the exemplary methods described above with respect to FIG. 6. Output channels whose behavior may be important to ensure plant-friendliness are desirably selected from among the set of all of the process outputs of the system, step 712. Expected steady-state values for the output signals of the selected output channels may then be determined from plant operation or simulation studies, for example. These values may be assigned as initial values to the selected output channels of the simplified model, step 714. Steady-state input signal levels for the input channels may also be determined. Steady-state gains for I/O relationships corresponding to each input/output channel pairing may be determined, step 716, as explained in the description of FIG. 6. By assuming linear dynamics of at least one desired order, the estimated steady-state gains for the selected I/O relationships may be used to create a simplified model of the local dynamics of the system, step 718.

A simulation of a plant test using the estimated amplitudes and initial assignments of the input perturbation signals may be run, step 720, on the simplified system model created in step 710. The perturbation test signals are added to the estimated steady-state input signal levels of the input channels determined in step 714 and applied to the input channels of the simplified system model created in step 710. The resulting output signals on the output channels of the simplified system model may then be calculated and stored.

Figure 8:
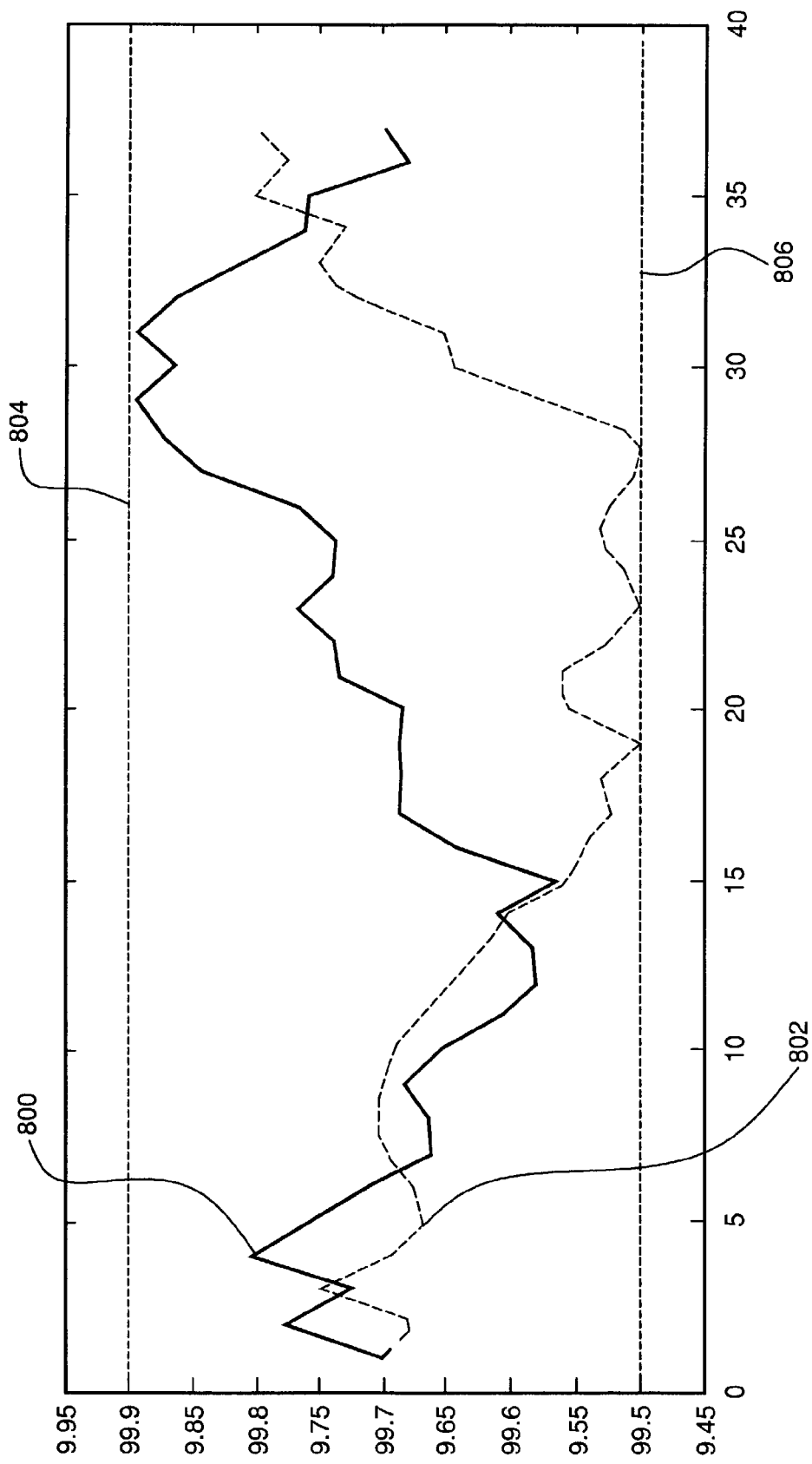
FIG. 8 is a graph of exemplary output test signals illustrating judgement according to plant-friendliness criteria.

The resulting output signals are judged against the plant-friendliness criteria provided in step 704 to determine if the input perturbation signals provide sufficient excitation of the system outputs, while maintaining plant-friendliness, step 722. FIG. 8 illustrates two exemplary output signals for a selected output channel, plant-friendly output signal 800 and plant-unfriendly output signal 802. These two exemplary output signals are compared to upper-bound plant-friendliness criterion 804 and lower-bound plant-friendliness criterion 806 for the selected output channel. Plant-friendly output signal 800 desirably varies between the plant-friendliness criteria 804 and 806 in a relatively even manner. On the other hand, plant-unfriendly output signal 802 remains close to the lower-bound plant-friendliness criterion 806 for a significant portion of time. While in both cases the output response is predicted to be substantially within the desired bounds (99.5–99.9%), plant-friendly output signal 800 is considered a plant-friendlier response because the output is maintained away from lower-bound plant-friendliness criterion 806, which is in the case of this example a product purity specification. It is desirable that product purity specifications not be violated during an exemplary plant test.

If the output signals are judged to exceed the plant-friendliness criteria then the exemplary method branches back to changing the perturbation signal assignments, step 726, and/or changing the perturbation signal amplitudes, step 728, at decision step 724, otherwise the perturbation signal assignments and amplitudes are accepted and the exemplary test is run on the system, step 730.

In the exemplary method illustrated in FIG. 7, with only two input channels, only one change to the assignment of the perturbation signals to input channels is possible, but in exemplary tests involving more than two input channels a greater variety of assignment possibilities exists. By knowing approximate steady-state gains for the selected outputs with respect to the inputs, it is possible to screen out a priori certain assignment possibilities that will most likely promote plant-unfriendliness That way one is left with a lesser number of assignment possibilities to be evaluated for plant-friendliness.

Once new perturbation signal assignments and/or amplitudes have been determined the procedure returns to running the simulation of the simplified system model, step 720. The resulting output signals are again judged, steps 722 and 724. If the trial test still exceeds the plant-friendliness criteria, another set of revised perturbation signal assignments and amplitudes may be determined in steps 726 and/or 728, respectively, until a plant-friendly set of test signals is found, or a set number of iterations is reached. It may be desirable to use data from all preceding simulations of the simplified system model to determine the revised perturbation signal assignments and amplitudes.

Figure 9:
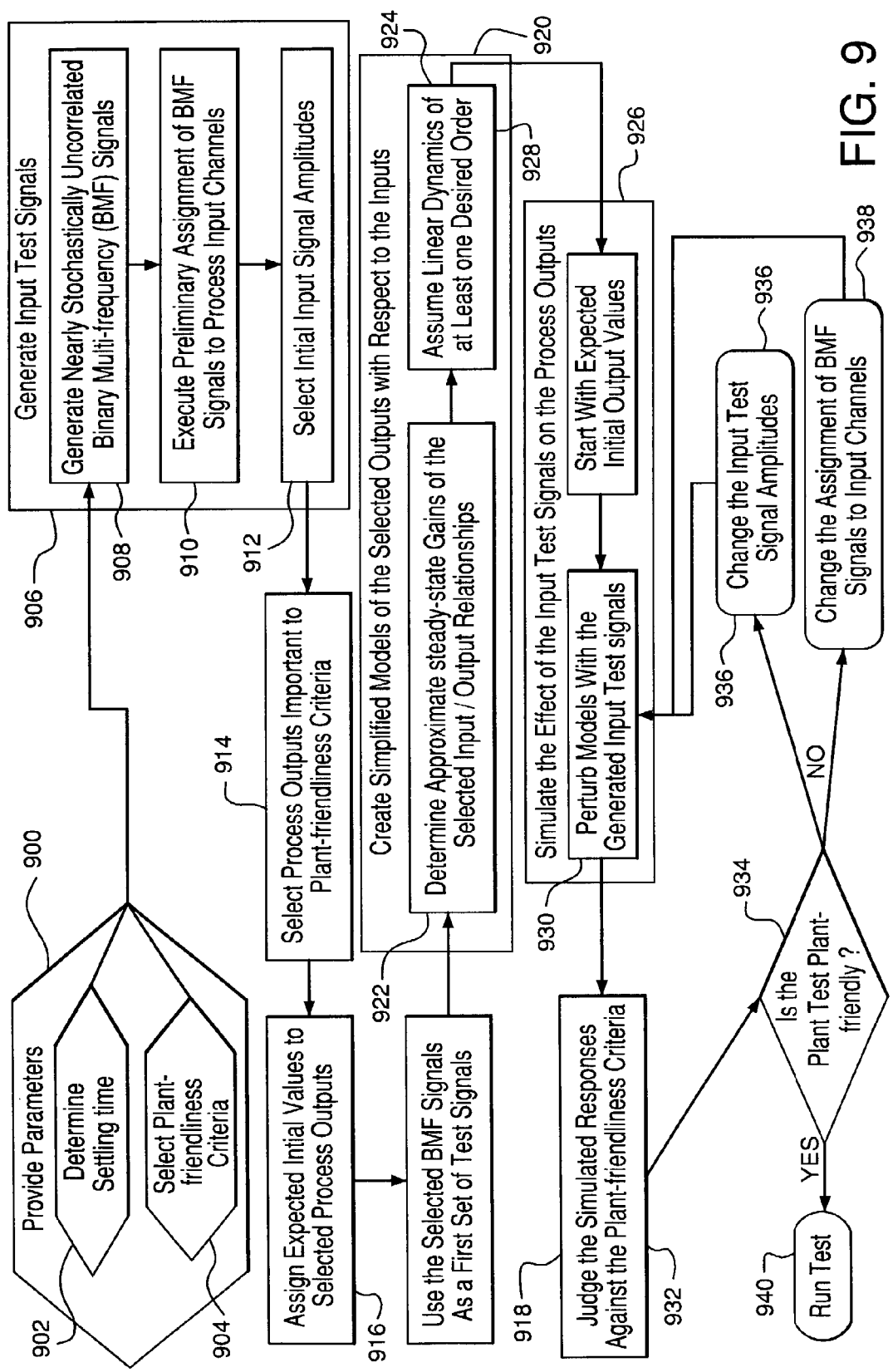
FIG. 9 is a flowchart illustrating an exemplary method of generating a set of nearly stochastically uncorrelated, plant-friendly BMF perturbation signals.

Detailed Description of the Flowchart of FIG. 9

FIG. 9 illustrates a further exemplary method for generating plant-friendly BMF input perturbation signals using a simplified system model to create a model for model-based control of the system. This exemplary method begins similarly to the exemplary methods of FIGS. 6 and 7.

Parameters used to generate the signals are provided, steps 900, 902, and 904. As in the exemplary methods of FIGS. 4, 5, 6, and 7, these parameters are determined based on a priori knowledge of the system to be tested. This knowledge may involve empirical data derived from plant operation, or the operation of similar plants. These parameters may be determined using procedures and considerations similar to those disclosed as part of the exemplary methods of FIGS. 4, 5, 6, and 7, above.

Once the parameters have been provided the BMF input perturbation test signals are generated, step 906. The methods of generating this set of nearly stochastically uncorrelated BMF signals, step 908, executing an initial assignment of the BMF perturbation signals to input channels, step 910, and selecting initial input signal amplitudes, step 912, may be similar to the methods used for steps 606, 608, and 610 in FIG. 6.

Output channels whose behavior may be important to ensure plant-friendliness are desirably selected from among the set of all of the process outputs of the system, step 914. This selection may be based on the criteria described above with respect to the exemplary method of FIG. 6. Expected steady-state values for the output signals of the selected output channels may then be determined based on a priori empiric or first-principles based knowledge of the system being tested. These values may be assigned as initial values to the selected output channels of the simplified model, step 916. The selected BMF signals are used as a first set of perturbation test signals, step 918, for a simplified model of the system being tested.

The exemplary simplified system model may be created, step 920, using the exemplary methods described above with respect to FIGS. 6 and 7. Steady-state input signal levels for the input channels may be determined. Steady-state gains for I/O relationships corresponding to each input/output channel pairing may be estimated via the options presented in the description of FIG. 6, step 922. By assuming linear dynamics of at least one desired order, the estimated steady-state gains for the selected I/O relationships may be used to create a simplified model of the system dynamics, step 924.

The effects of input perturbation tests signals having the estimated amplitudes and initial assignments is simulated, step 926, on the simplified system model of process outputs created in step 920. The perturbation test signals are added to the estimated steady-state input signal levels of the input channels, step 928, and applied to the input channels of the simplified system model, step 930. The resulting output signals on the output channels of the simplified system model may then be calculated and stored.

The resulting output signals are judged against the plant-friendliness criteria provided in step 904 to determine if the input perturbation signals provide sufficient excitation of the system outputs, while maintaining plant-friendliness, step 932.

If the output signals are judged to exceed the plant-friendliness criteria, then the exemplary method branches back to changing the perturbation signal amplitudes, step 936, and/or changing the perturbation signal assignments, step 938, at decision step 934, otherwise the perturbation signal assignments and amplitudes are accepted and the exemplary test is run on the system, step 940.

Once new perturbation signal assignments and/or amplitudes have been determined the procedure returns to running the simulation of the simplified system model, step 930. The resulting output signals are again judged, steps 932 and 934. If the trial test still exceeds the plant-friendliness criteria, another set of revised perturbation signal assignments and amplitudes may be determined in steps 936 and/or 938, respectively, until a plant-friendly set of test signals is found, or a set number of iterations is reached. It may be desirable to use data from all preceding simulations of the simplified system model to determine the revised perturbation signal assignments and amplitudes.

Figure 10:
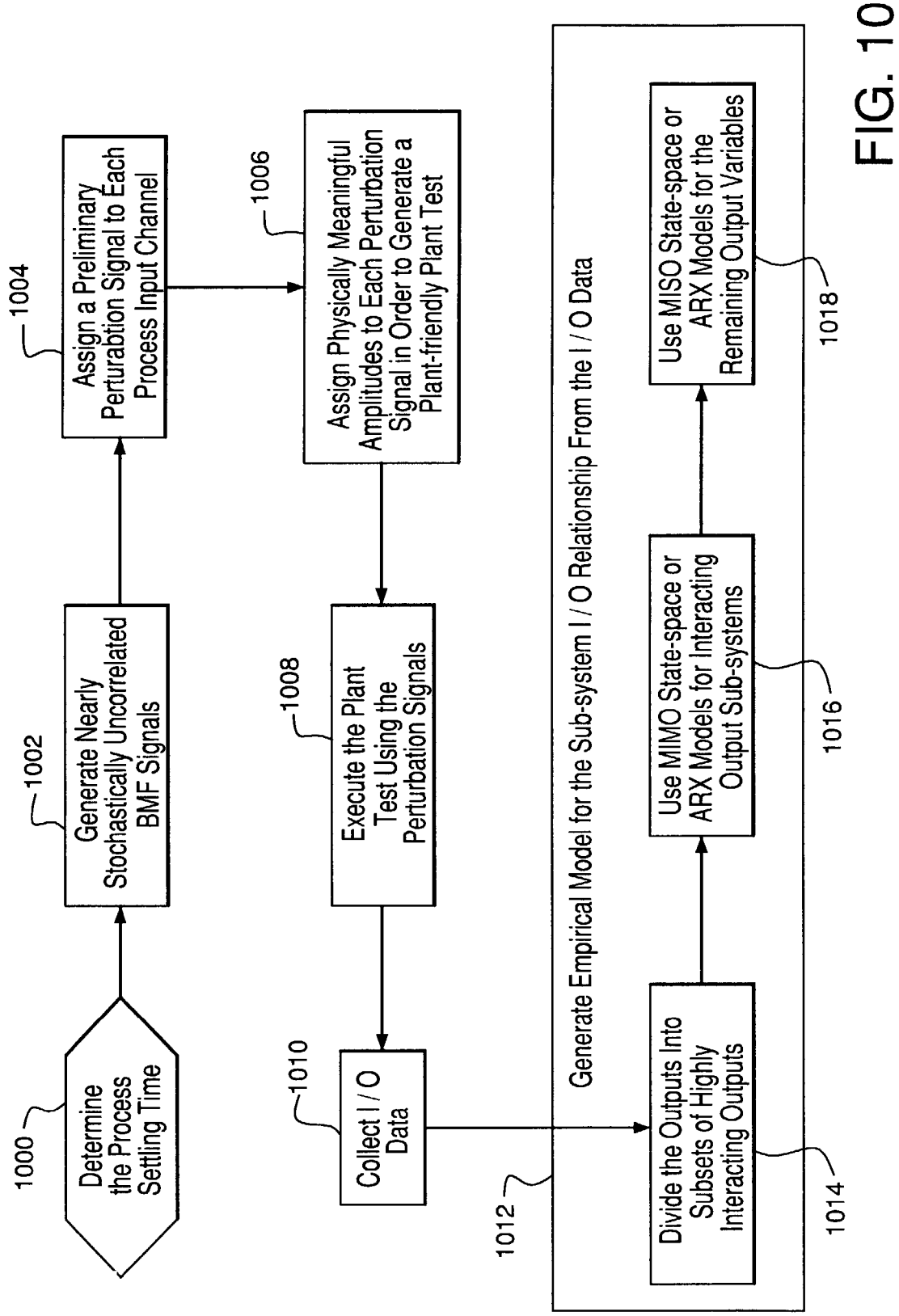
FIG. 10 is a flowchart illustrating an exemplary method of analysis of data from a plant test.

Detailed Description of the Flowchart of FIG. 10

FIG. 10 is a flowchart illustrating an exemplary method for designing a fast plant test to create a model of the plant for model-based control of the plant. The effective settling time, $T_{eff}$, is determined, step 1000, based on the time constants of the various outputs within the system and the aggressiveness of the model-based controller being designed for the system. $T_{eff}$ is the length of time during which a system may still be reacting to a significant degree to a perturbation in a control-relevant time scale. The focus for determining $T_{eff}$ is, therefore, on the outputs of the system which display the longest time constant. The exemplary method of FIG. 10 is designed to create an exemplary fast plant test utilizing a set of nearly stochastically uncorrelated BMF perturbation signals. Because the purpose of this exemplary plant test is to create a control relevant model of the plant for model-based control, the effective settling time parameter determined in step 100 may be shortened substantially from the open-loop settling time, depending on the aggressiveness of the desired model-based control feedback. In many cases, $T_{eff}$ may be 60% of the open-loop settling time. $T_{eff}$ may be determined based on a priori knowledge of the system to be tested. The determination of $T_{eff}$ may be based on empirical observations of the system, or, alternatively, may be obtained from a dynamic simulation of the plant (if one exists) or from experience based on other plants of a similar nature. Empirical data derived from plant operation is often preferable, due to the complexity of the systems generally considered. In the case of designing a model-based control system for a new plant, this data may involve step responses obtained from a dynamic simulation of the plant based on design parameters or information from similar existing plants. In the case of upgrading the control system of a plant that is already in operation, the experiences of plant operators and engineers and long-term data from previous control systems may provide significant amounts of empirical data from which the input perturbation signal parameters may be determined.

A number of nearly stochastically uncorrelated BMF signals are generated, step 1002, using the effective settling time provided in step 1000. It is desirable for there to be one BMF signal for each input channel. These nearly stochastically uncorrelated BMF signals may be generated by any of the methods described above with reference to FIG. 4.

Once the set of nearly stochastically uncorrelated BMF perturbation signals has been generated, an assignment of the perturbation signals to input channels of the system takes place, step 1004. Physically meaningful amplitudes are assigned to each input perturbation signal, in order to generate a plant-friendly test, step 1006. These amplitudes and assignments are desirably determined based on a priori empiric or first-principles based knowledge of the system being tested. Any of the methods described above with respect to FIGS. 5, 6, and 7 may also be used to determine the assignments and amplitudes of the input perturbation signals.

Next, an exemplary fast plant test of the system being studied is run, step 1008, using the perturbation signals determined in steps 1002, 1004, and 1006. This exemplary fast plant test may be run according to the methods described with regard to FIG. 3. It is contemplated that the test may be continued for several periods of the BMF perturbation signals to increase the S/N of the output data by averaging the data from the several cycles of the signals. The use of more than one perturbation signal period necessarily lengthens the test, but this disadvantage may be offset by the increased accuracy of the models that may be obtained with more data, particularly if there is a chance of significant operating mode changes during the course of the test. When possible it is desirable to minimize such effects, or to record important operating changes so that their effects may be taken into account in the modeling process.

The I/O data from the exemplary fast plant test is collected and stored for analysis, step 1010. The first portion of the output signals from each output channel, from t=0 to t=$T_{eff}$, are desirably removed from the data and not considered in the analysis. The same is done for the input channels. During this period it is likely that the plant is still reacting to pre-test conditions and therefore the data may not be an accurate reflection of the system responses to the perturbation signals.

Following the test the test data is analyzed to generate empirical models for the I/O relationships of interest in the system under test, step 1012. A pre-processing step, not shown, may be performed to desirably reduce artifacts caused by, for example, calibration data, outliers (e.g., an unusually large unmeasured disturbance, a temporary sensor or data channel failure, etc.), excessive noise and high-frequency or low-frequency disturbances outside of the control-relevant frequency window of interest. The pre-processing may involve a visual inspection of the data to ensure that the data appears reasonable. One may use software tools, such as MATLAB®, to view the data as either a time domain signal or in various frequency domain periodograms, such as a graph of the absolute squares of the Fourier transform of the signal. This visual inspection may be particularly useful to quickly remove badly corrupted data. Alternatively, data may be interpolated, rather than removed, for brief errors involving a relatively small number of samples.

Once obvious data deficiencies have been removed or corrected, it may be desirable to correct for effects of known non-linear effects. For example the use of flow ratios, valve transformations, other standard or tailor-made transformations are well known in the art. Additionally, it may be desirable to correct for offset in the input and output signals. Data for which the offset has been corrected may also be scaled to a predetermined range, preferably 0 to +1 or −1 to +1. The scaling transformations may be either linear or non-linear, depending on the physical meaning of the variable represented by the data.

Re-sampling and interpolation are other pre-processing possibilities for data that may have been sampled too fast (re-sampling) or too slowly (interpolation). Generally the sample rate may be selected to match the rate at which the model-based controller is designed to operate, so these pre-processing steps may not be necessary in most cases.

Filtering of the data, particularly the output signals, may be desirable as well. Depending on the application, interest in the model may be focused on specific frequency bands. Filtering the data before parameter estimation, through filters, may desirably enhance the control-relevant frequency bands and may improve the fit of the model in the frequency window of interest. Standard signal filtering techniques, such as Butterworth, Chebyshev, elliptic, and one-dimensional digital filters, may be used. The filtering may be band-pass, low-pass, or high-pass depending on the desired effect. It is noted that it is preferable for all input and output signals to be filtered using the same filter, if this pre-processing method is used. If only the output signals are filtered, then the controller should use the same filtered output and unfiltered input variables.

Following any desired pre-processing of the data, the generation of an empirical model for model-based control based on the pre-processed data may be performed. An exemplary linear model for a system output channel may be written as:

$$y(t)=Gu(t)+He(t) \qquad \text{Equation 6}$$

where y(t) is the measured output signal, G is the transfer function representing the dynamic properties of the system, u(t) is the vector of input signals, H is the noise model representing the noise characteristics of the system, e(t) is a standardized noise source.

Figure 11:
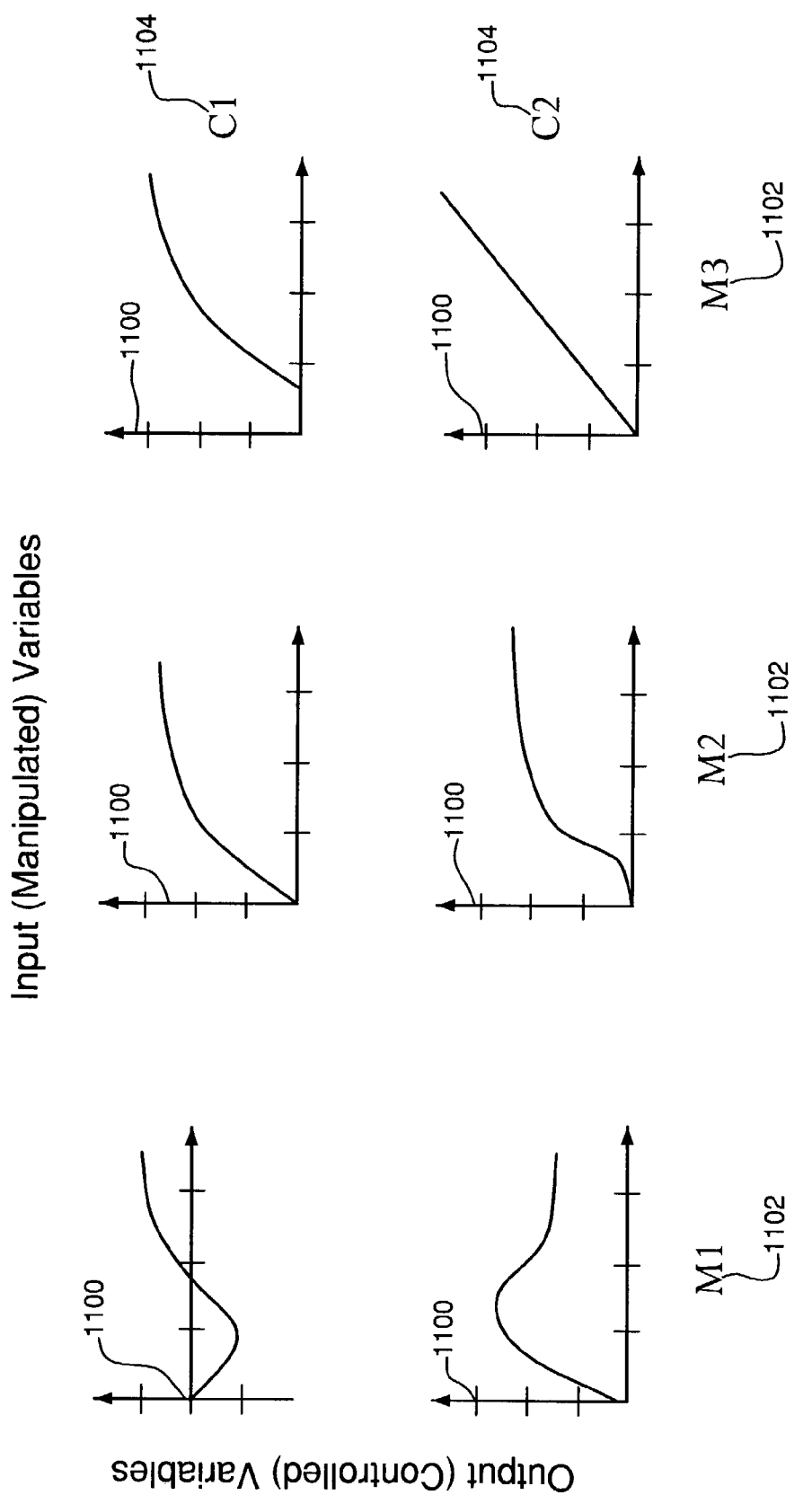
FIG. 11 is a set of graphs illustrating an exemplary matrix model of the plant for model-based control.

FIG. 11 illustrates a matrix of graphs 1100, which may be used as an exemplary depiction of the desired empirical system model generated by the exemplary method of step 1012 in FIG. 10, to be used in the model-based control of the system. Each graph 1100 represents the interaction between one control (manipulated) variable (input channel signal) 1102 and one output (controlled) variable (output channel signal) 1104. In an exemplary system, there may be additional complexity due to interactions between output channels. Such interacting output channels may desirably be analyzed together to improve the ability of the model to properly predict responses of these interacting output channels.

The output channels may be separated into a set of highly interacting output channels and a set of less interacting output channels, step 1014, based on a priori empiric or first-principles based knowledge of the system. Desirably, this separation may be accomplished using analysis of the physical nature of the system (e.g., in an air separation unit producing oxygen, nitrogen and argon, the oxygen composition in the vapor to the sidearm column directly impacts the oxygen composition in the argon product). The set of highly interacting output channels contains output signals of the system that exhibit a significant degree of interdependence among themselves.

Data from the output channels determined to be highly interacting in step 1014 are preferably analyzed together using a parametric identification dynamic model, such as multiple input/multiple output (MIMO) sub-space identification method and auto-regressive exogenous (ARX) models, step 1016. Alternatively, a non-parametric (for example, an impulse response, a step response, or a frequency response) dynamic model may be used. Data from channels exhibiting less interaction may be analyzed separately using simpler multiple input/single output (MISO) parametric models, ARX, auto-regressive moving average exogenous (ARMAX), output error (OE), Box-Jenkins (BJ), instrumental variable (IV4), prediction error methods (PEM), etc. models. It is noted that, even though the output channels may be analyzed separately, in step 1018, or in small groups in step 1016, all the input channels are desirably considered simultaneously on each (or set of) output channel(s) analyzed.

The theory of system identification and these underlying numerical techniques for parameter estimation are discussed in a number of texts, including *System Identification: Theory for the User*, L. Ljung, Prentice-Hall Information and System Sciences Series (1987), *System Identification*, T. Soderstrom and P. Stoica, Prentice-Hall International Series in Systems and Control Engineering (1989), and Numerical Methods for Unconstrained Optimization and Non-linear Equations, J. E. J. Dennis and R. B. Schnabel, Prentice-Hall (1983).

The resulting model may be tested by using the same input perturbation signals as were used during the system test in step 1008 and comparing the simulation output signals to the actual test output signals. An exemplary measure for estimating the model quality is the prediction error approach. In this exemplary approach, the number used to judge the model quality is the prediction error fit, $PE_j$:

$$PE_j = \frac{\|y_j - y_{j,sim}\|_2}{\sqrt{N_d}}, \ j = 1, 2, \ldots p \qquad \text{Equation 7}$$

where $\|\cdot\|$ is the 2-norm, $N_d$ is the number of data points used in the analysis, $y_j$ is the $j^{th}$ output signal, and $y_{j,sim}$ is the $j^{th}$ simulated output signal from the model.

Another exemplary measure of model quality may be to generate step response curves from the model and compare them to a priori knowledge of the system. Gain directionality, for example, may be known for many systems and may be used to screen various models quickly.

A further exemplary measure of model quality is based on residual analysis. The residuals associated with the data and an exemplary model are desirably white and independent of the input signals. The ACF of the noise term e(t) and the CCF of e(t) and u(t), the input signals, may be calculated to determine the whiteness of the residuals and their lack of stochastic correlation with the inputs.

It may be desirable for the output channels to be analyzed using more than one of the models, for example a MISO state-space model and an ARX model for an exemplary substantially non-interacting output channel. The results of the two models may then be compared to determine the accuracy of the models. In some systems, one model may prove greatly superior due to system, or test, characteristics, for example ARX models may not perform well on data with colored noise. The model order may be varied to improve the model's accuracy. After it has been determined that a given model does not provide a desirably good fit, the order of the model may be increased and the modeling tried again. Alternatively, the difficulties may be due to the absence of an additional independent variable in the analysis representing unmeasured effects during test. Non-linearities may also lead to model inaccuracies. If linear identification methods are not yielding acceptable results and non-linearities may be the cause, pre-processing of the data using linearizing transformations may be attempted to improve the model accuracy.

Another possibility is that the data may not be adequate. The data may have been corrupted, or unmeasured disturbances may have been too large. Also the input signals may not have been sufficiently stochastically uncorrelated due, e.g., to operating mode changes during test.

It may be desirable for the first modeling attempt with the data to be performed quickly and then the resulting rough model improved through iterative steps until a desirably accurate model is generated. An exemplary method for estimating the model parameters is based on the prediction error approach. In this exemplary approach, the parameters of the model are selected so that the difference between the model simulated output signal(s) and the measured signal(s) of the output channel(s) being analyzed is minimized.

Once a desirably accurate model has been determined by comparison to the test data, it may be desirable to perform a cross-validation test as well. A cross-validation test involves testing the model quality through simulation using a second set of input data not used to generate the model. Although the embodiments of the invention described above have been in terms of system tests for design of system models for model-based control, it is contemplated that similar concepts may be practiced with designs of system models for other purposes. Also, it will be understood to one skilled in the art that a number of other modifications exist which do not deviate from the scope of the present invention as defined by the appended claims.

The invention claimed is:

1. A method of producing perturbation signals adaptable to exciting a predetermined number of input variables of a system, in order to test that system for the purpose of obtaining models for the synthesis of a model-based controller, a method comprising the steps of:
    a) providing input parameters of the system;
    b) generating a plurality of binary multi-frequency (BMF) signals based on the input parameters;
    c) calculating the frequency spectra of the BMF signals generated in step (b);
    d) selecting one of the BMF signals of the set of BMF signals of step (b), the frequency spectrum of the one selected BMF signal most closely matching a desired frequency spectrum specified by the input parameters;
    e) using the selected BMF signal of step (d) as a first perturbation signal for system testing; and
    f) shifting the selected BMF signal of step (d) by a delay time amount of samples to create a delayed copy of the selected BMF signal in step (e) to be used as a second perturbation signal for system testing.

2. The method of claim 1 further comprising the steps of:
    g) increasing the delay time amount of samples; and
    h) repeating steps (f) and (g) to generate a set of delayed copy of the selected BMF signal including one less delayed copy of the selected BMF signal than the predetermined number of input variables of the system.

3. A method of producing perturbation signals adaptable to exciting a predetermined number of input variables of a system, in order to test that system for the purpose of obtaining models for the synthesis of a model-based controller, a method comprising the steps of:
    a) providing input parameters of the system;
    b) selecting a perturbation signal frequency spectrum;
    c) generating a plurality of binary multi-frequency (BMF) signals through optimization based on the information of steps (a) and (b);
    d) calculating the frequency spectra of the BMF signals generated in step (c);
    e) selecting, based on the match between the signal frequency spectra calculated in step (d) and the perturbation signal frequency spectrum of step (b), a set of the BMF signals of step (c), each BMF signal of the selected set of BMF signals of step (c) containing substantially 100% of useful power;
    f) selecting one of the BMF signals of the set of BMF signals of step (e), the frequency spectrum of the one selected BMF signal most closely matching the perturbation signal frequency spectrum selected in step (b);
    g) using the selected BMF signal of step (f) as a first perturbation signal;
    h) shifting the selected BMF signal of step (f) by a delay time amount of samples so that the original signal and its delayed copy are nearly stochastically uncorrelated during one system settling time; and
    i) using the signal generated in step (h) as a second perturbation signal.

4. The method of claim 3, further comprising the steps of:
    j) increasing the delay time amount of samples; and
    k) repeating steps (h), (i), and (j) to generate a set of delayed copy of the selected BMF signal including one less delayed copy of the selected BMF signal than the predetermined number of input variables of the system.

5. The method of claim 3 wherein step (b) includes the steps of:
    b1) selecting a control-relevant frequency window; and
    b2) selecting a perturbation signal power distribution over the control-relevant frequency window.

6. The method of claim 3, wherein each of the set of the BMF signals selected in step (e) has a crest factor less than a predetermined crest factor.

7. A method of producing plant-friendly perturbation signals adaptable to exciting a predetermined number of input channels of a system, in order to test that system for the purpose of obtaining models for the synthesis of a model-based controller, a method comprising the steps of:
    a) determining the system settling time;
    b) generating a plurality of nearly stochastically uncorrelated binary multi-frequency (BMF) signals to match the predetermined number of input channels of the system;
    c) executing a preliminary assignment of each BMF signal of step (b) to a system input channel;
    d) selecting plant-friendliness criteria corresponding to a plurality of system outputs;
    e) determining expected initial values corresponding to the plurality of system outputs in step (d);

f) determining approximate steady-state gains corresponding to the plurality of system outputs of step (d) with respect to the input channels;
g) selecting a set of amplitudes for the BMF signals of step (b);
h) determining a simplified system model of the system responses for the outputs of step (d), the simplified system model based on;
the system settling time of step (a);
the steady-state gains of step (f); and
linear dynamics of at least one predetermined order;
i) simulating the effect of the excitation of the input channels via the BMF signals on the system outputs using the simplified system model of step (h) and expected initial values corresponding to the plurality of system outputs in step (e);
j) judging the simulated responses in step (i) based on the plant-friendliness criteria in step (d); and
k) if the system responses of step (i) are judged in step (j) to exceed the plant-friendliness criteria;
changing, based on the judging of step (j), the assignment of BMF signals to input channels; and
repeating steps (i), (j) and (k).

8. A method of producing plant-friendly perturbation signals adaptable to exciting a predetermined number of input channels of a system, in order to test that system for the purpose of obtaining models for the synthesis of a model-based controller, a method comprising the steps of:
a) determining a system settling time;
b) generating a plurality of nearly stochastically uncorrelated binary multi-frequency (BMF) signals to match the predetermined number of input channels of the system;
c) executing an assignment of each BMF signal of step (b) to a system input channel;
d) selecting plant-friendliness criteria corresponding to a plurality of system outputs;
e) determining expected initial values corresponding to the plurality of system outputs in step (d);
f) determining approximate steady-state gains corresponding to the plurality of system outputs of step (d) with respect to the input channels;
g) selecting a set of amplitudes for the BMF signals of step (b);
h) determining a simplified system model of the system responses for the outputs of step (d), the simplified system model based on;
the system settling time of step (a);
the steady-state gains of step (f); and
linear dynamics of at least one predetermined order;
i) simulating the effect of the excitation of the input channels via the BMF signals on the system outputs using the simplified system model of step (h) and expected initial values corresponding to the plurality of system outputs in step (e);
j) judging the simulated responses in step (i) based on the plant-friendliness criteria in step (d); and
k) if the system responses of step (i) are judged in step (j) to exceed the plant-friendliness criteria;
changing, based on the judging of step (j), the amplitude of at least one BMF signal; and
repeating steps (i), (j) and (k).

9. The method of claim 8, wherein step (k) further includes changing the assignment of the BMF signals to the system input channels of step (c) for at least two BMF signals.

10. A method of producing plant-friendly perturbation signals adaptable to exciting a first predetermined number of input channels of a system, in order to test that system for the purpose of obtaining models for the synthesis of a model-based controller, a method comprising the steps of:
a) determining a system settling time;
b) generating a plurality of nearly stochastically uncorrelated binary multi-frequency (BMF) signals to match the first predetermined number of input channels of the system;
c) executing a candidate assignment of each BMF signal of step (b) to a system input channel;
d) selecting plant-friendliness criteria corresponding to a plurality of system outputs;
e) determining expected initial values corresponding to the plurality of system outputs in step (d);
f) determining approximate steady-state gains corresponding to the plurality of system outputs of step (d) with respect to the input channels;
g) selecting an initial set of amplitudes for the BMF signals of step (b);
h) determining a simplified system model of the system responses for the outputs of step (d), the simplified system model based on;
the system settling time of step (a);
the steady-state gains of step (f); and
linear dynamics of at least one predetermined order; and
i) solving a series of optimization problems to determine a calculated set of amplitudes of the BMF signals using the candidate assignment of perturbation signals to input channels of step (c), the initial set of amplitudes of step (g), the simplified system model of step (h), the expected initial output values of step (e), and the plant-friendliness criteria of step (d).

11. The method of claim 10, wherein solving the series of optimization problems in step (i) is based on maximizing excitation of the output responses within the plant-friendliness criteria of step (d).

12. The method of claim 10, further comprising the steps of:
j) changing the candidate assignment of perturbation signals to input channels;
k) repeating steps (i) and (j) to generate a second predetermined number of calculated sets of amplitudes of the BMF signals, each calculated set of amplitudes corresponding to one candidate assignment of perturbation signals to input channels; and
l) selecting a final assignment of perturbation signals to input channels and the corresponding calculated amplitudes of the BMF signals based on the plant friendliness criteria of step (d) and results of step (i).

13. A method of testing a system including a predetermined number of input channels and a plurality of output channels, for the purpose of obtaining a plurality of empirical models for the synthesis of a model-based controller, the model comprising the steps of:
a) generating a plurality of nearly stochastically uncorrelated binary multi-frequency (BMF) signals to match the predetermined number of input channels of the system;
b) assigning the plurality of BMF signals generated in step (a);
input channels; and
amplitudes;
c) executing a test of the system using the BMF signal assignments of step (b);

d) collecting a plurality of output signals generated on the plurality of output channels during the test;

e) judging interactions of the plurality of output signals collected in step (d) with respect to each other;

f) generating a first set of the empirical models representing output signals judged in step (e) to be substantially interacting, the first set of the empirical models generated using multi-input multi-output (MIMO) parametric modeling tools and based on the BMF signal assignments of step (b) and the output signals collected in step (d); and g) generating a second set of the empirical models representing output signals judged in step (e) not to be substantially interacting, the second set of the empirical models generated using multi-input single-output (MISO) parametric modeling tools and based on the BMF signal assignments of step (b) and the output signals collected in step (d).

14. The method of claim 13, wherein:
the MIMO parametric modeling tools include at least one of;
a state-space model; or
an auto-regressive exogenous (ARX) model; and
the MISO parametric modeling tools include at least one of;
a state-space model;
an ARX model;
an auto-regressive moving average exogenous model;
an output-error model; or
a Box-Jenkins model.

15. The method of claim 13, wherein the BMF signal to input channel assignments and BMF signal amplitude assignments of step (b) are selected to generate a plant-friendly test.

16. A method of producing plant-friendly perturbation signals adaptable to exciting a plurality of input channels of a system, in order to test that system for the purpose of obtaining models for the synthesis of a model-based controller, a method comprising the steps of:

a) providing a settling time, a dominant time constant, an estimated first signal amplitude, an estimated second signal amplitude, and plant-friendliness criteria of the system;

b) providing an estimated perturbation signal frequency spectrum for the test signals;

c) generating a plurality of binary multi-frequency (BMF) signals based on the parameters provided in step (a);

d) calculating frequency spectra of the BMF signals generated in step (c);

e) selecting, based on the frequency spectra calculated in step (d), a set of the BMF signals of step (c), each BMF signal of the selected set of BMF signals including substantially 100% useful power;

f) selecting one of the BMF signals of the set of BMF signals of step (e), the frequency spectrum of the one selected BMF signal substantially matching the estimated perturbation signal frequency spectrum of step (b);

g) using the selected BMF signal of step (f) as a first test signal;

h) setting a first test signal amplitude to the estimated first signal amplitude;

i) shifting the selected BMF signal of step (f) by one settling time of the system to use as a second test signal having an estimated second signal amplitude;

j) setting a second test signal amplitude to the estimated second signal amplitude;

k) simulating responses of the system using the first test signal and the second test signal;

l) judging the responses of step (k) based on the plant-friendliness criteria; and m) if the responses of step (k) are judged in step (l) to exceed the plant-friendliness criteria;
changing, based on the judging of step (l), at least one of the first test signal amplitude or the second test signal amplitude; and
repeating steps (k), (l), and (m).

17. The method of claim 16, wherein step (m) further includes exchanging the first test signal and the second test signal.

18. A method of producing plant-friendly perturbation signals adaptable to exciting a plurality of input channels of a system, in order to test that system for the purpose of obtaining models for the synthesis of a model-based controller, a method comprising the steps of:

a) providing an estimated first signal amplitude, an estimated second signal amplitude, and plant-friendliness criteria of the system;

b) providing a first test signal and a second test signal, the second test signal being nearly stochastically uncorrelated to the first test signal;

c) setting a first test signal amplitude to the estimated first signal amplitude;

d) selling a second test signal amplitude to the estimated second signal amplitude;

e) simulating responses of the system using the first test signal and the second test signal;

f) judging the responses of step (e) based on the plant-friendliness criteria; and g) if the responses of step (e) are judged in step (f) to exceed the plant-friendliness criteria;
changing, based on the judging of step (f), at least one of the first test signal amplitude or the second test signal amplitude; and
repeating steps (e), (f), and (g).

19. The method of claim 18, wherein step (g) further includes exchanging the first test signal and the second test signal.

20. A method of producing plant-friendly perturbation signals adaptable to exciting a predetermined number of input channels of a system, in order to test that system for the purpose of obtaining models for the synthesis of a model-based controller, a method comprising the steps of:

a) determining a system setting time;

b) generating a plurality of nearly stochastically uncorrelated binary multi-frequency (BMF) signals to match the predetermined number of input channels of the system;

c) executing an assignment of each BMF signal of step (b) to a system input channel;

d) selecting plant-friendliness criteria corresponding to a plurality of system outputs;

e) determining expected initial values corresponding to the plurality of system outputs in step (d);

f) determining approximate steady-state gains corresponding to the plurality of system outputs of step (d) with respect to the input channels;

g) selecting a set of amplitudes for the BMF signals of step (b);

h) determining a simplified system model of the system responses for the outputs of step (d), the simplified system model based on;
the system settling time of step (a);
the steady-state gains of step (f); and
linear dynamics of at least one predetermined order;
i) simulating the effect of the excitation of the input channels via the BMF signals on the system outputs using the simplified system model of step (h) and expected initial values corresponding to the plurality of system outputs in step (e);
j) judging the simulated responses in step (i) based on the plant-friendliness criteria in step (d); and
k) if the system responses of step (i) are judged in step (j) to exceed the plant-friendliness criteria;
changing, based on the judging of step (j), the assignment of the BMF signals to the system input channels of step (c) for at least two BMF signals; and
repeating steps (i), (j) and (k).

21. A method of producing plant-friendly perturbation signals adaptable to exciting a plurality of input channels of a system, in order to test that system for the purpose of obtaining models for the synthesis of a model-based controller, a method comprising the steps of:
a) providing a settling time, a dominant time constant, an estimated first signal amplitude, an estimated second signal amplitude, and plant-friendliness criteria of the system;
b) providing an estimated perturbation signal frequency spectrum for the test signals;
c) generating a plurality of binary multi-frequency (BMF) signals based on the parameters provided in step (a);
d) calculating frequency spectra of the BMF signals generated in step (c);
e) selecting, based on the frequency spectra calculated in step (d), a set of the BMF signals of step (c), each BMF signal of the selected set of BMF signals including substantially 100% useful power;
f) selecting one of the BMF signals of the set of BMF signals of step (e), the frequency spectrum of the one selected BMF signal substantially matching the estimated perturbation signal frequency spectrum of step (b);
g) using the selected BMF signal of step (f) as a first test signal;
h) setting a first test signal amplitude to the estimated first signal amplitude;
i) shifting the selected BMF signal of step (f) by one settling time of the system to use as a second test signal having an estimated second signal amplitude;
j) selling a second test signal amplitude to the estimated second signal amplitude;
k) simulating responses of the system using the first test signal and the second test signal;
l) judging the responses of step (k) based on the plant-friendliness criteria; and
m) if the responses of step (k) are judged in step (l) to exceed the plant-friendliness criteria;
exchanging, based on the judging of step (l), the first test signal and the second test signal; and
repeating steps (k), (l), and (m).

22. A method of producing plant-friendly perturbation signals adaptable to exciting a plurality of input channels of a system, in order to test that system for the purpose of obtaining models for the synthesis of a model-based controller, a method comprising the steps of:
a) providing an estimated first signal amplitude, an estimated second signal amplitude, and plant-friendliness criteria of the system;
b) providing a first test signal and a second test signal, the second test signal being nearly stochastically uncorrelated to the first test signal;
c) setting a first test signal amplitude to the estimated first signal amplitude;
d) setting a second test signal amplitude to the estimated second signal amplitude;
e) simulating responses of the system using the first test signal and the second test signal;
f) judging the responses of step (e) based on the plant-friendliness criteria; and
g) if the responses of step (e) are Judged in step (f) to exceed the plant-friendliness criteria;
exchanging, based on the judging of step (f), the first test signal and the second test signal; and
repeating steps (e), (f), and (g).

23. An apparatus for producing perturbation signals adaptable to exciting a predetermined number of input variables of a system, in order to test that system for the purpose of obtaining models for the synthesis of a model-based controller, comprising:
means of providing input parameters of the system;
means of generating a plurality of binary multi-frequency (BMF) signals based on the input parameters;
means of calculating the frequency spectra of the generated BMF signals;
means of comparing the frequency spectra of the generated BMF signals to a desired frequency spectrum specified by the input parameters;
means of selecting one of the BMF signals of the set of BMF signals, the frequency spectrum of the one selected BMF signal most closely matching the desired frequency spectrum;
means of using the one selected BMF signal as a first perturbation signal for system testing; and
means of shifting the one selected BMF signal by a delay time amount of samples to create a delayed copy of the one selected BMF signal to be used as a second perturbation signal for system testing.

24. An apparatus for producing plant-friendly perturbation signals adaptable to exciting a predetermined number of input channels of a system, in order to test that system for the purpose of obtaining models for the synthesis of a model-based controller, comprising:
means of determining the system settling time;
means of generating a plurality of nearly stochastically uncorrelated binary multi-frequency (BMF) signals to match the predetermined number of input channels of the system;
means of executing a candidate assignment of each BMF signal to a system input channel;
means of selecting plant-friendliness criteria corresponding to a plurality of system outputs;
means of determining expected initial values corresponding to the plurality of system outputs;
means of determining approximate steady-state gains corresponding to the plurality of system outputs with respect to the input channels;
means of selecting an initial set of amplitudes for the BMF signals;

means of determining a simplified led system model of the system responses for the outputs, the simplified system model based on;
the system settling time;
the steady-state gains; and
linear dynamics of at least one predetermined order;
means of simulating the effect of the excitation of the input channels via the BMF signals on the system outputs using the simplified system model and expected initial values corresponding to the plurality of system outputs;
means of judging the simulated responses based on the plant-friendliness criteria and the expected initial values corresponding to the plurality of system outputs;
optimizing means of changing at least one of;
the assignment of BMF signals to input channels based on the judged simulated responses; or
the amplitude of at least one BMF signal based on the judged simulated responses.

25. The apparatus of claim 24, wherein the optimizing means includes means of solving a series of optimization problems to determine a calculated set of amplitudes of the BMF signals using the candidate assignment of perturbation signals to input channels, the initial set of amplitudes of the BMF signals, the simplified system model, the expected initial output values, and the plant-friendliness criteria.

26. The apparatus of claim 25, wherein the means of solving the series of optimization problems maximizes excitation of the output responses within the plant-friendliness criteria.

27. An apparatus for testing a system including a predetermined number of input channels and a plurality of output channels, for the purpose of obtaining a plurality of empirical models for the synthesis of a model-based controller, comprising:
means of generating a plurality of nearly stochastically uncorrelated binary multi-frequency (BMF) signals to match the predetermined number of input channels of the system;
means of assigning the plurality of BMF signals;
input channels; and
amplitudes;
means of executing a test of the system using the BMF signal assignments;
means of collecting a plurality of. output signals generated on the plurality of output channels during the test;
means of judging interactions of the plurality of collected output signals with respect to each other;
means of generating a first set of the empirical models representing output signals judged to be substantially interacting, the first set of the empirical models generated using multi-input multi-output (MIMO) parametric modeling tools and based on the BMF signal assignments and the collected output signals; and
means of generating a second set of the empirical models representing output signals judged not to be substantially interacting, the second set of the empirical models generated using multi-input single-output (MISO) parametric modeling tools and based on the BMF signal assignments and the collected output signals.

28. The apparatus of claim 27, wherein:
the MIMO parametric modeling tools include at least one of;
a state-space model; or
an auto-regressive exogenous (ARX) model; and
the MISO parametric modeling tools include at least one of;
a state-space model;
an ARX model;
an auto-regressive moving average exogenous model;
an output-error model; or
a Box-Jenkins model.

29. The apparatus at claim 27, wherein the BMF signal to input channel assignments and BMF signal amplitude assignments are selected to generate a plant-friendly test.

* * * * *

UNITED STATES PATENT AND TRADEMARK OFFICE
CERTIFICATE OF CORRECTION

PATENT NO. : 7,194,317 B2 Page 1 of 1
APPLICATION NO. : 10/225675
DATED : March 20, 2007
INVENTOR(S) : Kothare et al.

It is certified that error appears in the above-identified patent and that said Letters Patent is hereby corrected as shown below:

Column 32, Line 30

In claim 18 delete the word "selling" and insert the word -- setting --

Column 32, Line 51

In claim 20 delete the word "setting" and insert the word -- settling --

Column 33, Line 53

In claim 21 delete the word "selling" and insert the word -- setting --

Column 34, Line 17

In claim 22 delete the word "Judged" and insert the word -- judged --

Column 35, Line 1

In claim 24 delete the word "led"

Signed and Sealed this

First Day of May, 2007

JON W. DUDAS
*Director of the United States Patent and Trademark Office*